(12) United States Patent
Shiba et al.

(10) Patent No.: US 7,689,475 B2
(45) Date of Patent: Mar. 30, 2010

(54) DISTRIBUTION CONTROL SYSTEM AND METHOD, AND SERVER APPARATUS AND ITS CONTROL METHOD

(75) Inventors: Rikio Shiba, Kanagawa (JP); Takayuki Nagatsuka, Kanagawa (JP); Yukihiko Shimizu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 2109 days.

(21) Appl. No.: 10/113,673

(22) Filed: Apr. 2, 2002

(65) Prior Publication Data
US 2002/0147667 A1 Oct. 10, 2002

(30) Foreign Application Priority Data
Apr. 6, 2001 (JP) .............................. 2001-109001
Mar. 14, 2002 (JP) .............................. 2002-070321

(51) Int. Cl.
*G06Q 10/00* (2006.01)
*G06Q 30/00* (2006.01)
*G06F 17/30* (2006.01)
*G07G 1/00* (2006.01)

(52) U.S. Cl. .............................. 705/28; 705/1.1; 705/10
(58) Field of Classification Search ....................... None
See application file for complete search history.

(56) References Cited

U.S. PATENT DOCUMENTS

| | | | | |
|---|---|---|---|---|
| 5,666,493 A | * | 9/1997 | Wojcik et al. | 705/26 |
| 5,712,989 A | * | 1/1998 | Johnson et al. | 705/28 |
| 5,758,329 A | * | 5/1998 | Wojcik et al. | 705/28 |
| 6,085,170 A | * | 7/2000 | Tsukuda | 705/26 |
| 6,463,345 B1 | * | 10/2002 | Peachey-Kountz et al. | 700/99 |
| 6,963,847 B1 | * | 11/2005 | Kennedy et al. | 705/8 |
| 7,050,995 B2 | * | 5/2006 | Wojcik et al. | 705/28 |
| 7,249,044 B2 | * | 7/2007 | Kumar et al. | 705/8 |
| 7,257,552 B1 | * | 8/2007 | Franco | 705/28 |
| 2002/0095307 A1 | * | 7/2002 | Greamo et al. | 705/1 |
| 2002/0133387 A1 | * | 9/2002 | Wilson et al. | 705/8 |

FOREIGN PATENT DOCUMENTS

| | | |
|---|---|---|
| JP | 6-149848 | 5/1994 |
| JP | 10-171867 | 6/1998 |
| JP | 10-214298 | 8/1998 |
| JP | 11-031182 | 2/1999 |
| JP | 2000-293595 | 10/2000 |

* cited by examiner

*Primary Examiner*—F. Ryan Zeender
*Assistant Examiner*—Asfand M Sheikh
(74) *Attorney, Agent, or Firm*—Fitzpatrick, Cella, Harper & Scinto

(57) ABSTRACT

A manufacturer and retailer, which supply and sell articles such as business expendables or the like, stock articles in considerable quantities in their warehouses. However, such stocks are not always appropriate due to diversity of articles and difficulty in demand prediction, and articles cannot be delivered in a short term. A main server controls stock reserve of a branch warehouse on the basis of the check result of the urgency level of received order information, which is received from a user's information processing apparatus via a communication line, and the comparison result between the order quantity indicated by the received order information, and a non-reserved stock quantity.

5 Claims, 31 Drawing Sheets

FIG. 5

TONER CARTRIDGE ORDERING WEB SITE

INPUT CUSTOMER NUMBER AND PASSWORD

CUSTOMER NUMBER

PASSWORD

OK    CANCEL

FIG. 6

TONER CARTRIDGE ORDERING WEB SITE

HELLO, ○×△ COMPANY
YOUR DEALER IS ○● COMPANY

101 — FOLLOWING TONER CARTRIDGES ARE REQUIRED
FOR YOUR APPARATUSES. INPUT ORDER QUANTITIES.

| MODEL NUMBER | PRICE | ORDER QUANTITY |
|---|---|---|
| A CRG (FOR LBP A) | ¥20,000 | |
| B CRG (FOR FAX B) | ¥30,000 | |

102 — SELECT SETTLEMENT METHOD
◉ SAME AS PREVIOUS ORDER
   (DIRECT DEBIT FROM □■ BANK)
○ BANK TRANSFER
○ INVOICE SETTLEMENT
○ OTHER

103 — DESIGNATE DESIRED DELIVERY DATE IN yyyy.mm.dd FORM,
AND THEN DESIGNATE AM/PM
DELIVERY DATE [        ]   ◉ AM   ○ PM 104 — PLEASE COOPERATE IN RECOVERY OF USED
TONER CARTRIDGES
   WE GIVE YOU POINTS ACCORDING TO RECOVERED
   QUANTITY/RECOVERY RATE
   CLICK HERE TO SEE MORE INFORMATION
   REQUEST RECOVERY         ◉ YES   ○ NO

[ SUBMIT ]   [ CANCEL ]

FIG. 7

TONER CARTRIDGE ORDERING WEB SITE

ORDER NUMBER IS 123-3567

| MODEL NUMBER | PRICE | ORDER QUANTITY |
|---|---|---|
| A CRG (FOR LBP A) | ¥20,000 | 3 |
| B CRG (FOR FAX B) | ¥30,000 | 2 |

TOTAL AMOUNT IS ¥120,000

SETTLEMENT METHOD IS DIRECT DEBIT FROM □■ BANK
DESIRED DELIVERY DATE IS FEBRUARY 14, 2000, PM
REQUEST RECOVERY OF USED TONER CARTRIDGE

PLEASE CONFIRM YOUR ORDER CONTENTS ?

[ OK ]  [ CANCEL ]

FIG. 8

TONER CARTRIDGE ORDERING WEB SITE

THANK YOU FOR ORDERING

PRESS [CONTINUE] BUTTON TO CONTINUE ORDERING,
[CONFIRM] BUTTON TO CONFIRM YOUR ORDER CONTENTS,
OR [LOGOUT] BUTTON TO END ORDERING

[CONTINUE]   [CONFIRM]   [LOGOUT]

FIG. 9

TONER CARTRIDGE ORDERING WEB SITE

HELLO, ○×△ COMPANY
YOUR DEALER IS ○● COMPANY

101 — FOLLOWING TONER CARTRIDGES ARE REQUIRED FOR YOUR APPARATUSES. INPUT ORDER QUANTITIES.

| MODEL NUMBER | PRICE | ORDER QUANTITY |
|---|---|---|
| A CRG (FOR LBP A) | ¥20,000 | |
| B CRG (FOR FAX B) | ¥30,000 | |

102 — SELECT SETTLEMENT METHOD
- ◉ SAME AS PREVIOUS ORDER (DIRECT DEBIT FROM □■ BANK)
- ○ BANK TRANSFER
- ○ INVOICE SETTLEMENT
- ○ OTHER

103 — DESIGNATE DESIRED DELIVERY DATE IN yyyy.mm.dd FORM, AND THEN DESIGNATE AM/PM

DELIVERY DATE [　　　] ◉ AM ○ PM

105 — THANK YOU FOR YOUR COOPERATION IN RECOVERY OF USED TONER CARTRIDGES

RECOVERED QUANTITY/RECOVERY RATE/POINTS OF ○×△ COMPANY IS 200 / 70% / 200 POINTS

[ SUBMIT ]  [ CANCEL ]

WE ARE VERY SORRY.
WE DO OUR BEST TO AVOID SUCH SITUATION
WE'LL BE WAITING FOR YOUR NEXT ORDER

FIG. 18

ESTIMATED DELIVERY TIME TABLE

| DESTINATION POSTAL CODE | WAREHOUSE NAME | PRIORITY ORDER | WEEKDAY PM |
|---|---|---|---|
| | | | ESTIMATED DELIVERY TIME (MINUTES) |
| 111-1111 | SHINAGAWA WAREHOUSE | B1 | 10 |
| 111-1111 | OHTA WAREHOUSE | B2 | 40 |
| 111-1111 | KAWASAKI WAREHOUSE | B3 | 160 |
| ---- | ---- | ---- | ---- |
| 111-1112 | OHTA WAREHOUSE | B1 | 70 |
| 111-1112 | KAWASAKI WAREHOUSE | B2 | 90 |
| 111-1112 | SETAGAYA WAREHOUSE | B3 | 140 |

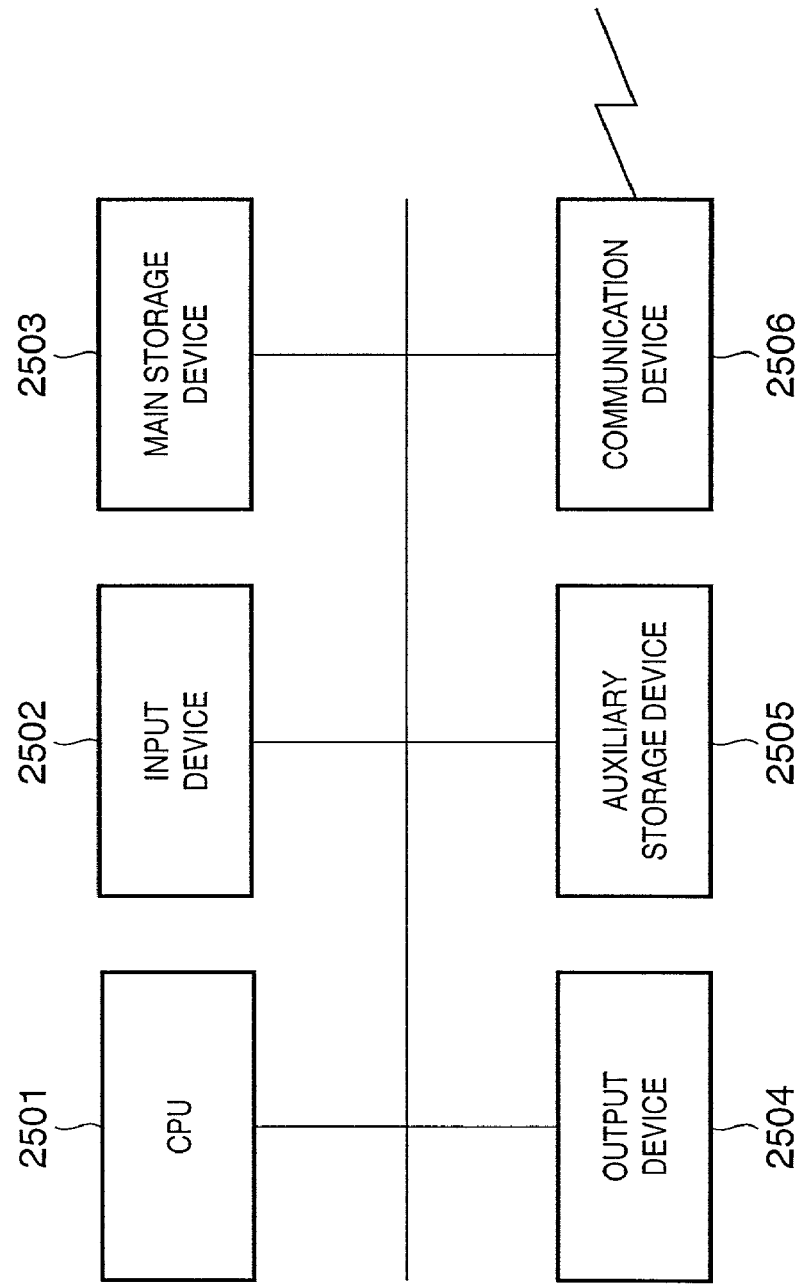

FIG. 20

TONER CARTRIDGE ORDERING WEB SITE

HELLO, ○×△ COMPANY
YOUR DEALER IS ○● COMPANY

101 — FOLLOWING TONER CARTRIDGES ARE REQUIRED
FOR YOUR APPARATUSES. INPUT ORDER QUANTITIES.

| MODEL NUMBER | PRICE | ORDER QUANTITY |
|---|---|---|
| A CRG (FOR LBP A) | ¥20,000 | 1000 |

102 — SELECT SETTLEMENT METHOD
⦿ SAME AS PREVIOUS ORDER
   (DIRECT DEBIT FROM □■ BANK)
○ BANK TRANSFER
○ INVOICE SETTLEMENT
○ OTHER

DESIRED DELIVERY DATE

111 — DAY-OF-ORDER DELIVERY CAN BE SET UNTIL 13:00.
PLEASE CLICK [DAY-OF-ORDER] BUTTON.
WE'LL CONTACT YOU SOON ABOUT OK/NG
OF DAY-OF-ORDER DELIVERY.

112 — [DAY-OF-ORDER (MARCH 2)] CURRENT TIME IS 11:59, MARCH 2, 2002

DELIVERY DATE [ ▼] YEAR [ ▼] MONTH [ ▼] DAY
⦿ AM  ○ PM

104 — PLEASE COOPERATE IN RECOVERY OF USED
TONER CARTRIDGES
  WE GIVE YOU POINTS ACCORDING TO RECOVERED
  QUANTITY/RECOVERY RATE
  CLICK HERE TO SEE MORE INFORMATION
  REQUEST RECOVERY     ⦿ YES  ○ NO

[SUBMIT]  [CANCEL]

FIG. 22

| RECEIVED ORDER INFORMATION | |
|---|---|
| ORDER QUANTITY NQ | 1,000 |
| DATE OF ORDER PLACEMENT PD | 20020302 |
| ORDER PLACEMENT TIME PT | 1158 |
| DELIVERY DATE DD | 20020302 |
| DELIVERY ADDRESS | OHTAKU ○○○ |

FIG. 23A

C CRG RECEIVED ORDER STATUS TABLE (UPDATED: 20020302/1159)
B CRG RECEIVED ORDER STATUS TABLE (UPDATED: 20020302/1159)
A CRG RECEIVED ORDER STATUS TABLE (UPDATED: 20020302/1159)

| ORDER NUMBER | RECEIVED ORDER INFORMATION NUMBER | DATE OF ORDER PLACEMENT PD/PT | ORDER QUANTITY NQ | DELIVERY DATE DD | SHIPPING INSTRUCTION FLAG | |
|---|---|---|---|---|---|---|
| | | | | | WAREHOUSE FLAG | SHIPPING FLAG |
| 123-1 | | 20020302/0805 | 600 | 20020303 | BW | SHIPPING-INSTRUCTION READY |
| 123-2 | | 20020302/0855 | 500 | 20020302 | BW | SHIPPING INSTRUCTION |
| 123-3 | | 20020304/0912 | 300 | 20020304 | BW | SHIPPING-INSTRUCTION READY |
| 123-4 | | 20020303/0933 | 800 | 20020303 | BW | SHIPPING-INSTRUCTION READY |
| | | | | | | |

FIG. 23B

A CRG RECEIVED ORDER STATUS TABLE (UPDATED: 20020302/1159)

| ORDER NUMBER | RECEIVED ORDER INFORMATION NUMBER | DATE OF ORDER PLACEMENT PD/PT | ORDER QUANTITY NQ | DELIVERY DATE DD | SHIPPING INSTRUCTION FLAG | |
|---|---|---|---|---|---|---|
| | | | | | WAREHOUSE FLAG | SHIPPING FLAG |
| 123-1 | P(3) | 20020302/0805 | 600 | 20020303 | BW | SHIPPING-INSTRUCTION READY |
| 123-2 | | 20020302/0855 | 500 | 20020302 | BW | SHIPPING INSTRUCTION |
| 123-3 | P(1) | 20020304/0912 | 300 | 20020304 | BW | SHIPPING-INSTRUCTION READY |
| 123-4 | P(2) | 20020303/0933 | 800 | 20020303 | BW | SHIPPING-INSTRUCTION READY |
| | | | | | | |

FIG. 23C

A CRG RECEIVED ORDER STATUS TABLE (UPDATED: 20020302/1159)

| ORDER NUMBER | RECEIVED ORDER INFORMATION NUMBER | DATE OF ORDER PLACEMENT PD/PT | ORDER QUANTITY NQ | DELIVERY DATE DD | SHIPPING INSTRUCTION FLAG ||
|---|---|---|---|---|---|---|
| | | | | | WAREHOUSE FLAG | SHIPPING FLAG |
| 123-1 | | 20020302/0805 | 600 | 20020303 | BW | SHIPPING-INSTRUCTION READY |
| 123-2 | | 20020302/0855 | 500 | 20020302 | BW | SHIPPING INSTRUCTION |
| 123-3 | | 20020304/0912 | 300 | 20020304 | MW | SHIPPING INSTRUCTION |
| 123-4 | | 20020303/0933 | 800 | 20020303 | MW | SHIPPING INSTRUCTION |
| | | | | | | |
| | | | | | | |

FIG. 23D

A CRG RECEIVED ORDER STATUS TABLE (UPDATED: 20020302/1200)

| ORDER NUMBER | RECEIVED ORDER INFORMATION NUMBER | DATE OF ORDER PLACEMENT PD/PT | ORDER QUANTITY NQ | DELIVERY DATE DD | SHIPPING INSTRUCTION FLAG ||
|---|---|---|---|---|---|---|
| | | | | | WAREHOUSE FLAG | SHIPPING FLAG |
| 123-1 | | 20020302/0805 | 600 | 20020303 | BW | SHIPPING-INSTRUCTION READY |
| 123-2 | | 20020302/0855 | 500 | 20020302 | BW | SHIPPING INSTRUCTION |
| 123-3 | | 20020304/0912 | 300 | 20020304 | MW | SHIPPING INSTRUCTION |
| 123-4 | | 20020303/0933 | 800 | 20020303 | MW | SHIPPING INSTRUCTION |
| 123-5 | | 20020302/1158 | 1,000 (NEW) | 20020302 | BW | SHIPPING INSTRUCTION |
| | | | | | | |

FIG. 23E

A CRG RECEIVED ORDER STATUS TABLE (UPDATED: 20020302/1159)

| ORDER NUMBER | RECEIVED ORDER INFORMATION NUMBER | DATE OF ORDER PLACEMENT PD/PT | ORDER QUANTITY NQ | DELIVERY DATE DD | SHIPPING INSTRUCTION FLAG | |
|---|---|---|---|---|---|---|
| | | | | | WAREHOUSE FLAG | SHIPPING FLAG |
| 123-1 | | 20020302/0805 | 300 | 20020303 | BW | SHIPPING-INSTRUCTION READY |
| 123-2 | | 20020302/0855 | 500 | 20020302 | BW | SHIPPING INSTRUCTION |
| 123-3 | | 20020304/0912 | 100 | 20020304 | BW | SHIPPING-INSTRUCTION READY |
| 123-4 | | 20020303/0933 | 200 | 20020303 | BW | SHIPPING-INSTRUCTION READY |
| 123-5 | | 20020302/1158 | 1,000 (NEW) | 20020302 | MW | SHIPPING INSTRUCTION |
| | | | | | | |

FIG. 24A

| C CRG BRANCH WAREHOUSE STOCK TABLE (UPDATED: 20020302/1159) | | |
|---|---|---|
| B CRG BRANCH WAREHOUSE STOCK TABLE (UPDATED: 20020302/1159) | | |
| A CRG BRANCH WAREHOUSE STOCK TABLE (UPDATED: 20020302/1159) | | |
| TOTAL STOCK QUANTITY | NON-RESERVED STOCK QUANTITY BS | SHIPPING-INSTRUCTION STOCK QUANTITY |
| 2,200 | 0 | 500 |
| A CRG MASTER WAREHOUSE STOCK TABLE (UPDATED: 20020302/1159) | | |
| TOTAL STOCK QUANTITY | NON-RESERVED STOCK QUANTITY BS | SHIPPING-INSTRUCTION STOCK QUANTITY |
| 10,000 | 10,000 | 0 |

FIG. 24B

| A CRG BRANCH WAREHOUSE STOCK TABLE (UPDATED: 20020302/1200) | | |
|---|---|---|
| TOTAL STOCK QUANTITY | NON-RESERVED STOCK QUANTITY BS | SHIPPING-INSTRUCTION STOCK QUANTITY |
| 2,200 | 100 | 500 |
| A CRG MASTER WAREHOUSE STOCK TABLE (UPDATED: 20020302/1200) | | |
| TOTAL STOCK QUANTITY | NON-RESERVED STOCK QUANTITY BS | SHIPPING-INSTRUCTION STOCK QUANTITY |
| 10,000 | 8,900 | 1,100 |

FIG. 25

TONER CARTRIDGE ORDERING WEB SITE

THANK YOU FOR ORDERING

○×△ COMPANY
ORDER NUMBER 123-5

| MODEL NUMBER | PRICE | ORDER QUANTITY |
|---|---|---|
| A CRG (FOR LBP A) | ¥20,000 | 1,000 |

YOUR ORDER WILL BE DELIVERED TODAY

PRESS [CONTINUE] BUTTON TO CONTINUE ORDERING,
[CONFIRM] BUTTON TO CONFIRM YOUR ORDER CONTENTS,
OR [LOGOUT] BUTTON TO END ORDERING

[CONTINUE]   [CONFIRM]   [LOGOUT]

F I G. 26

TONER CARTRIDGE ORDERING WEB SITE

○×△ COMPANY
ORDER NUMBER 123-5

MODEL NUMBER       PRICE        ORDER QUANTITY
A CRG (FOR LBP A)  ¥20,000      1,000

SORRY, YOUR ORDER IS OUT OF STOCK IN NEAREST WAREHOUSE,
AND WILL BE DELIVERED TOMORROW

ORDER         CANCEL

FIG. 27

TONER CARTRIDGE ORDERING WEB SITE

THANK YOU FOR ORDERING

○×△ COMPANY
ORDER NUMBER 123-5

| MODEL NUMBER | PRICE | ORDER QUANTITY |
|---|---|---|
| A CRG (FOR LBP A) | ¥20,000 | 1,000 |

YOUR ORDER WILL BE DELIVERED AT DESIGNATED
DELIVERY DATE (MARCH 4, 2002)

[CONTINUE]  [CONFIRM]  [LOGOUT]

DISTRIBUTION CONTROL SYSTEM AND METHOD, AND SERVER APPARATUS AND ITS CONTROL METHOD

FIELD OF THE INVENTION

The present invention relates to a distribution control system and method, and a server apparatus and its control method and, for example, to efficient and effective management of stock, shipping, and delivery dates of articles such as toner cartridges and the like.

BACKGROUND OF THE INVENTION

Printers, copying machines, and facsimile apparatuses which use electrophotography are indispensable apparatuses in business. These electrophotography apparatuses require expendables such as toner and the like. If such expendables are used up and cannot be immediately replenished, these apparatuses can no longer be used. In order to avoid such situation, each office maintains and manages an appropriate stock of expendables. Recently, a department called Information Manager of System (IMS) that maintains and manages an appropriate stock of expendables for the entire business establishment is present.

Some electrophotography apparatuses receive toner via a cartridge called a toner cartridge. A toner cartridge corresponding to the model of each apparatus must be mounted on it, and printers of different models normally require different toner cartridges. Hence, in offices or business establishments using many kinds of apparatuses, a large number of types of toner cartridges must be stocked, maintained, and managed. Note that not only toner cartridges but also all business supplies consumed in offices or business establishments require maintenance and management of appropriate stock. In the following description, articles such as toner cartridges are also called "business expendables". The "business expendables" include toners for copying machines, photosensitive drums, inks for ink-jet printers, other service parts, paper sheets, OHP sheets, and the like in addition to toner cartridges.

The following demands have been arisen for the sales form and stock management of business expendables with such characteristics.

[Sales Form]

As the Internet is widespread, the use of the Internet is demanded upon selling and ordering business expendables. Systems which sell articles using the Internet already exist. However, some systems do not immediately reply as to the delivery date, or customers are often not satisfied with the term required until an ordered article is delivered.

[Stock Management]

In conventional stock management, upon receiving an order from a customer via the Internet, e-mail message, phone, or the like, a stock is reserved for the order, and reserve information is managed using a stock database in association with information such as the profile of the customer, order quantity, article type, delivery date, and the like. The stock data base is looked up by an information processing apparatus to check the stock quantity or the like every time a new order is received.

In such stock management that reserves a stock for each received order, and manages the stock quantity using the stock database, upon receiving an order that requires a quantity which exceeds a non-reserved stock quantity managed by the stock database, a stock cannot be reserved. However, since some of the already reserved stocks require urgent delivery but some other do not, stock management including a stock reserve process in consideration of the urgency of delivery is demanded.

On the other hand, orders that require urgent delivery may be frequently placed for toner cartridges which are typical business expendables, and store toners used in copying machines, printers, and the like, since copying machines and printers can no longer be used if toner is used up. If articles cannot be provided for orders that require urgent delivery due to out of stock, non-operating times of the copying machines and printers are prolonged, resulting in poor business efficiency on the side of customers.

SUMMARY OF THE INVENTION

The present invention has been made to individually or simultaneously solve the aforementioned problems, and has as its object to simultaneously manage distributions of articles.

It is another object of the present invention to implement article distributions in consideration of a short term.

In order to achieve the above objects, a preferred embodiment of the present invention discloses a server apparatus comprising a receiver, arranged to receive received order information which is received from an information processing apparatus via a communication line and contains at least information indicating an order quantity of an article, order placement time, and a delivery date, a controller, arranged to control stock reserve of an article with reference to the received order information, and a database which manages stock information and shipping information of the article, and a transmitter, arranged to transmit window information indicating a delivery date reply for the received order information to the information processing apparatus via the communication line, wherein the controller controls the stock reserve on the basis of a checking result of an urgency level of the new received order information, and a comparison result between the order quantity indicated by the received order information, and a non-reserved stock quantity.

Also, a preferred embodiment of the present invention discloses a control method of a server comprising the steps of receiving received order information which is received from an information processing apparatus via a communication line and contains at least information indicating an order quantity of an article, order placement time, and a delivery date, controlling stock reserve of an article with reference to the received order information, and a database which manages stock information and shipping information of the article, and transmitting window information indicating a delivery date reply for the received order information to the information processing apparatus via the communication line, wherein the stock reserve is controlled on the basis of a checking result of an urgency level of the new received order information, and a comparison result between the order quantity indicated by the received order information, and a non-reserved stock quantity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5 to 12 show windows displayed on a user's terminal upon placing an order of a toner cartridge;

FIG. 18 shows an estimated delivery time table of a warehouse database;

FIG. 19 is a block diagram showing a typical arrangement of a computer;

FIG. 20 shows an order window in the second embodiment;

FIG. 22 is a view for explaining received order information;

FIGS. 23A to 23E are views for explaining received order status tables;

FIGS. 24A and 24B are views for explaining stock tables;

FIG. 25 shows window information indicating that day-of-order delivery is OK;

FIG. 26 shows window information indicating that day-of-order delivery is NG; and FIG. 27 shows window information indicating a delivery date reply.

DESCRIPTION OF THE PREFERRED EMBODIMENTS

An article sales system according to the present invention will be described in detail hereinafter with reference to the accompanying drawings. In this embodiment, business expendables such as toner cartridges and the like used in apparatuses such as electrophotography printers, copying machines, facsimile apparatuses, and the like will be exemplified as articles. However, the present invention can be applied to other articles: for example, toners for copying machines, photosensitive drums, inks for ink-jet printers, other service parts, paper sheets, OHP sheets, and the like.

First Embodiment

[Flow of Toner Cartridge]

Figure 1:
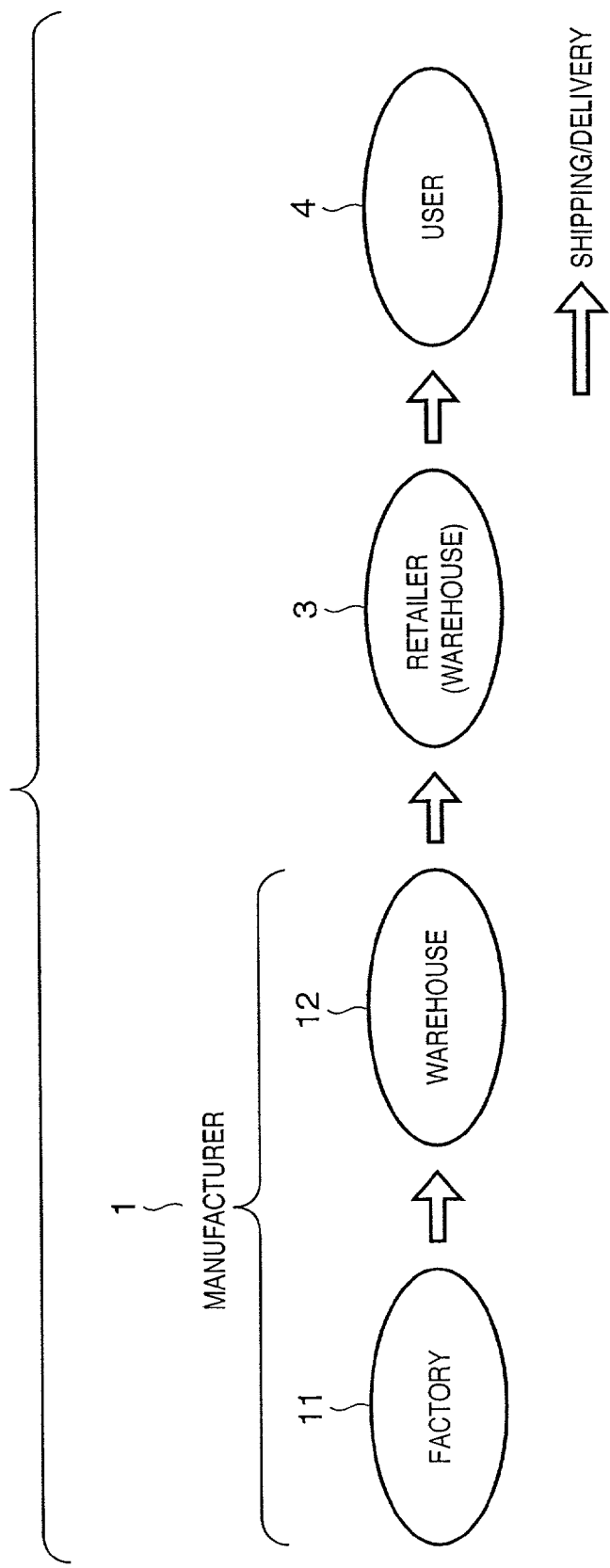
FIG. 1 is a view for explaining the current flow of toner cartridges.

FIG. 1 is a view for explaining the current flow of toner cartridges.

Referring to FIG. 1, toner cartridges which are manufactured in correspondence with the production plan in a factory 11 of a manufacturer 1 are transported to a warehouse 12 of the manufacturer. When an order is placed from a retailer 3 to the manufacturer 1, a considerable number of days are often required to deliver the ordered toner cartridge to the retailer 3 (or its warehouse). Toner cartridges can be delivered from the retailer 3 to a user 4 at least within a day (the next day of the day of order) if they are in stock.

Figure 2:
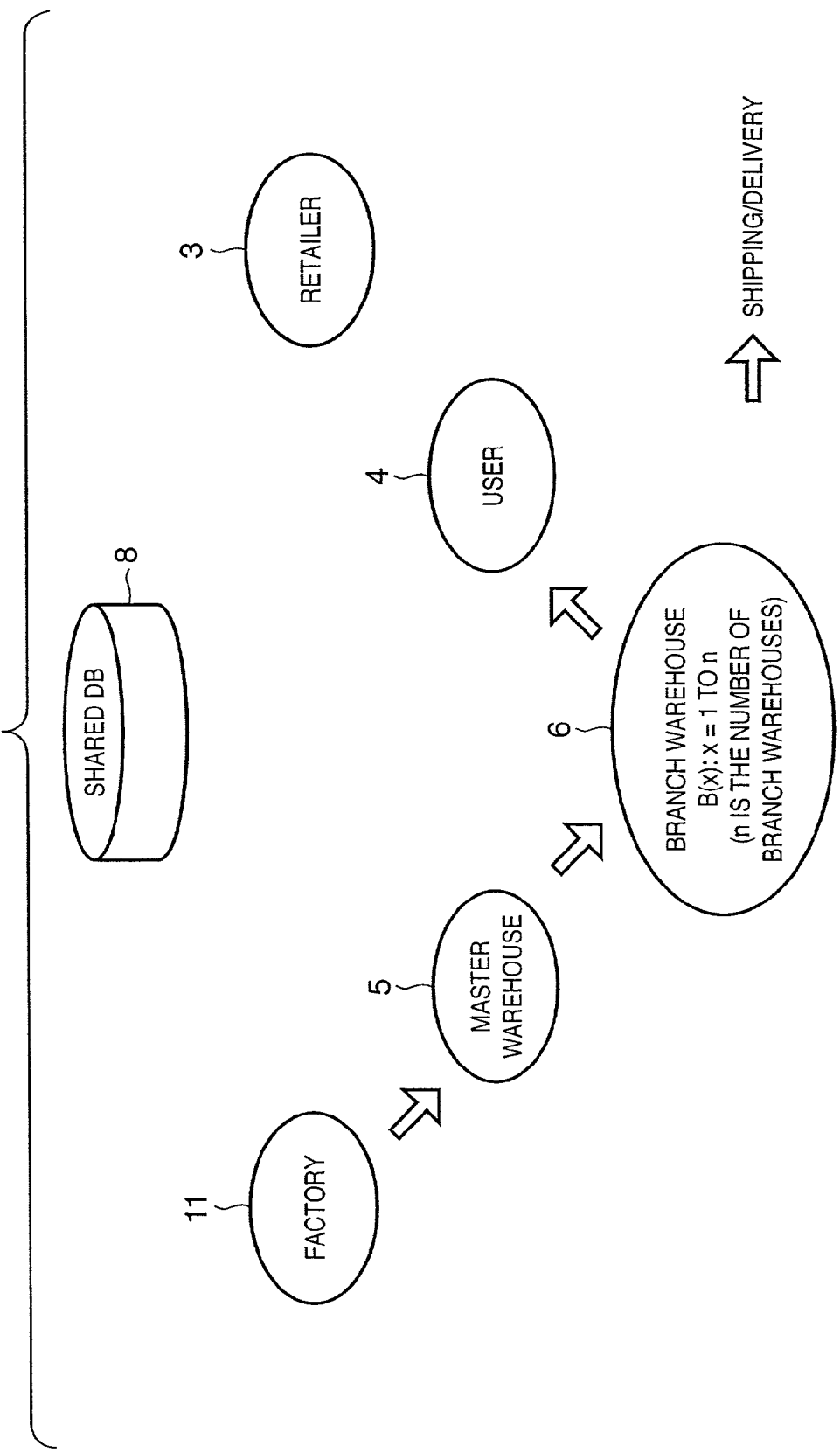
FIG. 2 is a view showing the flow of toner cartridges in this embodiment.

FIG. 2 is a view showing the flow of toner cartridges in this embodiment.

Referring to FIG. 2, toner cartridges which are manufactured in correspondence with the production plan in a factory 11 of a manufacturer 1 are transported to a master warehouse 5. The toner cartridges which are once stocked in the master warehouse 5 are delivered to a plurality of branch warehouses 6 B(x): x=1 to n (n is the number of branch warehouses), which are distributed to respective areas, in correspondence with a shipping schedule (to be described later). As will be described in detail later, when a user 4 has placed an order, toner cartridges are delivered from a branch warehouse 6 B(l) closest to the designated destination to the user 4. If the ordered toner cartridges are out of stock in the branch warehouse 6 B(1), they may be shipped from another branch warehouse 6 B(2) or the like.

The master warehouse 5 shown in FIG. 2 is a core warehouse serving as the center of the flow of toner cartridges, and is prosecuted by the manufacturer 1, the retailer 3, a physical distribution agent, or the like. The branch warehouses 6 as contacts to the user 4 are preferably prosecuted by the physical distribution agent.

A shared database (DB) 8 simultaneously manages production in the factory 11, stocks in the master and branch warehouses 5 and 6, orders from the user 4, and physical distribution among the factory 11, master and branch warehouses 5 and 6, and user 4. The purpose of such simultaneous management is to realize appropriate production, stock, and physical distribution, and to allow delivery of toner cartridges ordered by the user 4 within, e.g., one day.

By building and systemizing the flow of toner cartridges, as shown in FIG. 2, the user can surely get desired toner cartridges in a short term, and can quickly receive a delivery OK/NG reply to the desired delivery date. Therefore, a stock of many types of toner cartridges can be easily maintained and managed in offices and business establishments that use many kinds of printers, copying machines, and facsimile apparatuses. Furthermore, in a small office or business establishment, since the user can place an order of a toner cartridge after the toner remaining amount becomes lower than a given threshold value and a printer or the like outputs an exchange announcement message of the toner cartridge, the need for stock management itself can be obviated.

In other words, since the shared DB 8 simultaneously manages production, physical distribution, stock, order reception, and delivery of many kinds of toner cartridges, stocks of toner cartridges can be adjusted between the master warehouse 5 and the plurality of branch warehouses 6 in correspondence with production and received orders. Therefore, even when the warehouse of the retailer 3 or the like has no stock of business expendables, toner cartridges can be supplied to the user 4 in a short term, and problems caused by out of stock or overstock of the retailer 3, an increase in interest payment burden due to overstock, and the like can be solved.

The sales system which can implement the flow of toner cartridges shown in FIG. 2 will be described in detail below.

A main server 81 provides the shared DB 8. Note that the shared DB 8 is not always provided by a single server but may be provided separately or parallelly by a plurality of servers. That is, the shared DB 8 need only be logically provided as one database.

A plurality of terminals which use the shared DB 8 are connected to the main server 81 via a wide-area network (WAN) 100 such as the Internet or the like. Terminals 13, 31, 41, 51, 61, and 71 are respectively those of the manufacturer 1, retailer 3, user 4, master warehouse 5, and branch warehouses 6. Also, a terminal 32 is a mobile terminal that a sales person or service person of the retailer 3 uses, and a terminal 62 is a mobile terminal that a transport service person of the physical distribution agent uses.

The internal structure of the main server 81 shown in FIG. 2 will be described below with reference to FIG. 19.

As shown in FIG. 19, the main server 81 comprises a Central Processing Unit (CPU) 2501, input device 2502, main storage device 2503, output device 2504, auxiliary storage device 2505, communication device 2506, and the like.

The CPU 2501 as a processing device has a control function of controlling the operations of respective devices in the system by sending commands to these devices, and a function of executing arithmetic processes of digital data in the core of the server.

The input device 2502 is used to input various data, and may comprise a keyboard, a pointing device such as a mouse or the like, a touch panel, a pressure-sensitive pad, a CCD camera, a card reader, a paper tape reader, a magnetic tape reader, and the like. For example, instruction data is input from the input device 2502 such as a mouse or the like via an interface window shown in FIG. 6. The CPU 2501 recognizes the input information and starts the next process.

The main storage device 2503 indicates the entire addressable memory space used to execute commands in respective processing devices and internal storage device. The main storage device 2503 mainly comprises a semiconductor element, and stores and holds input programs and data. The CPU 2501 reads out data held in a memory to, e.g., a register. The semiconductor element which forms the main storage device 2503 includes a Random Access Memory (RAM), Read Only Memory (ROM), and the like. ID information and password information input via a user interface shown in FIG. 5 are temporarily stored in the main storage device 2503. The CPU 2501 sends the temporarily stored information via the communication device 2506 (corresponding to step S1 in FIG. 4). The main storage device 2503 also has a function of a display memory used to display the user interface shown in FIG. 5.

The output device 2504 is used to output the arithmetic result of the CPU 2501, and corresponds to a display device such as a CRT, plasma display, liquid crystal display, or the like, a printing device such as a printer or the like, an audio output device, and so forth. In this embodiment, a display device of each terminal shown in FIG. 3 corresponds to the output device 2504.

The auxiliary storage device 2505 holds nonvolatile data to compensate for the limited storage capacity of the main storage device 2503, and corresponds to a magnetic disk device, an optical disk device, a semiconductor disk device, and media and drives of a floppy disk, CD-ROM, CD-R, CD-R/W, MO, DVD, and the like. The auxiliary storage device 2505 is used to implement a database function, and corresponds to the shared DB 8 in this embodiment. The auxiliary storage device 2505 also has a function of storing programs as in the main storage device.

The communication device 2506 is used to communicate with an external network, and performs transmission/reception of data, digital/analog conversion, and the like as needed in correspondence with the type of network connected. In this embodiment, data are sent in respective steps in FIG. 4 via the communication device 2506 under the control of the CPU 2501.

The aforementioned devices are interconnected by a data bus, and are used to communicate various data in two ways.

[Shared Database]

The shared DB 8 stores information of the following databases and their fields. Such information is provided to the respective terminals shown in FIG. 3, and is updated by these terminals. The following databases and their fields are added or deleted in correspondence with users as targets of the sales/recovery system, the characteristics of business expendables, and the like.

Retailer information database
Retailer ID and password
Name, address, telephone number, and FAX number
E-mail address
Customer service person information
Sales record information
Stock information
Warehouse information database
Master warehouse information
Branch warehouse information
Master-branch coupling information
Warehouse-by-warehouse stock information
Warehouse shippable stock information
Warehouse-by-warehouse shipping-instructed stock information
Warehouse-by-warehouse shipping-instruction ready stock information
Estimated delivery time
Note that the following terms will be used for stock status and warehouses hereinafter.
Non-reserved stock (shippable stock): a stock which is not reserved for any order.
Shipping-instruction ready stock: a stock which has already been temporarily reserved, but has a time margin until it is shipped. When an order with an earlier delivery date is received, reserve may be changed (a delivery date reply has already been sent to a customer).
Shipping-instructed stock: a stock which has already been reserved for an order (a delivery date reply has already been sent to a customer).
M warehouse (master warehouse): assume that this warehouse is prepared in one place (or several places) countrywide, and articles delivered from the factory are temporarily stocked in this warehouse. B(x) warehouses (x=1 to n, branch warehouses):
articles are delivered from these warehouses to customers in principle. B1 is closest to the destination of a given order. B2, B3, . . . become farther from the destination (n is the number of branch warehouses).

The master warehouse information and branch warehouse information contain the locations of these warehouses. The master-branch coupling information contains information indicating the time required to transport articles from the master warehouse 5 to each branch warehouse 6, the time required to transport articles between branch warehouses 6, and the like. Furthermore, the warehouse-by-warehouse stock information contains information indicating appropriate stock quantities of respective warehouses in addition to the above information.

The main server 81 can control stock movement from the master warehouse 5 to the branch warehouses 6 and distribution of delivery for a plurality of branch warehouses 6 on the basis of the above information. If toner cartridges ordered by the user 4 are out of stock in the nearest branch warehouse 6 B(1), the main server 81 can control to reserve a stock in the branch warehouse 6 B(2) which has the second highest priority with respect to the geographic information of the delivery destination so that the toner cartridges can be delivered until the desired delivery date of the user 4 or the next best delivery date.

Product information database
Product name and model number
Related expendable
Product-dependent stock information Price information
Customer information database
User ID and password
Name, address, telephone number, and FAX number
E-mail address
Retailer, sales person, and service person in charge
Nearest branch warehouse #1 and estimated delivery time to destination
Nearest branch warehouse #2 and estimated delivery time to destination
Nearest branch warehouse #n and estimated delivery time to destination
Purchased product name (model) and quantity
Order history
Payment history
Price information
Shipping information database
Shipping destination customer information
Status
Order number
Date of order
Ordered item
Delivery date
Price
Payment method
Shipping date
Arrival date
Inspection date
Manufacturer, retailer information, physical distribution agent information
Manufacturer ID and password
Retailer ID and password
Sales person ID and password
Service person ID and password
Warehouse ID and password
Transport service person ID and password

[Order Placement Sequence and Window]

Figure 4:
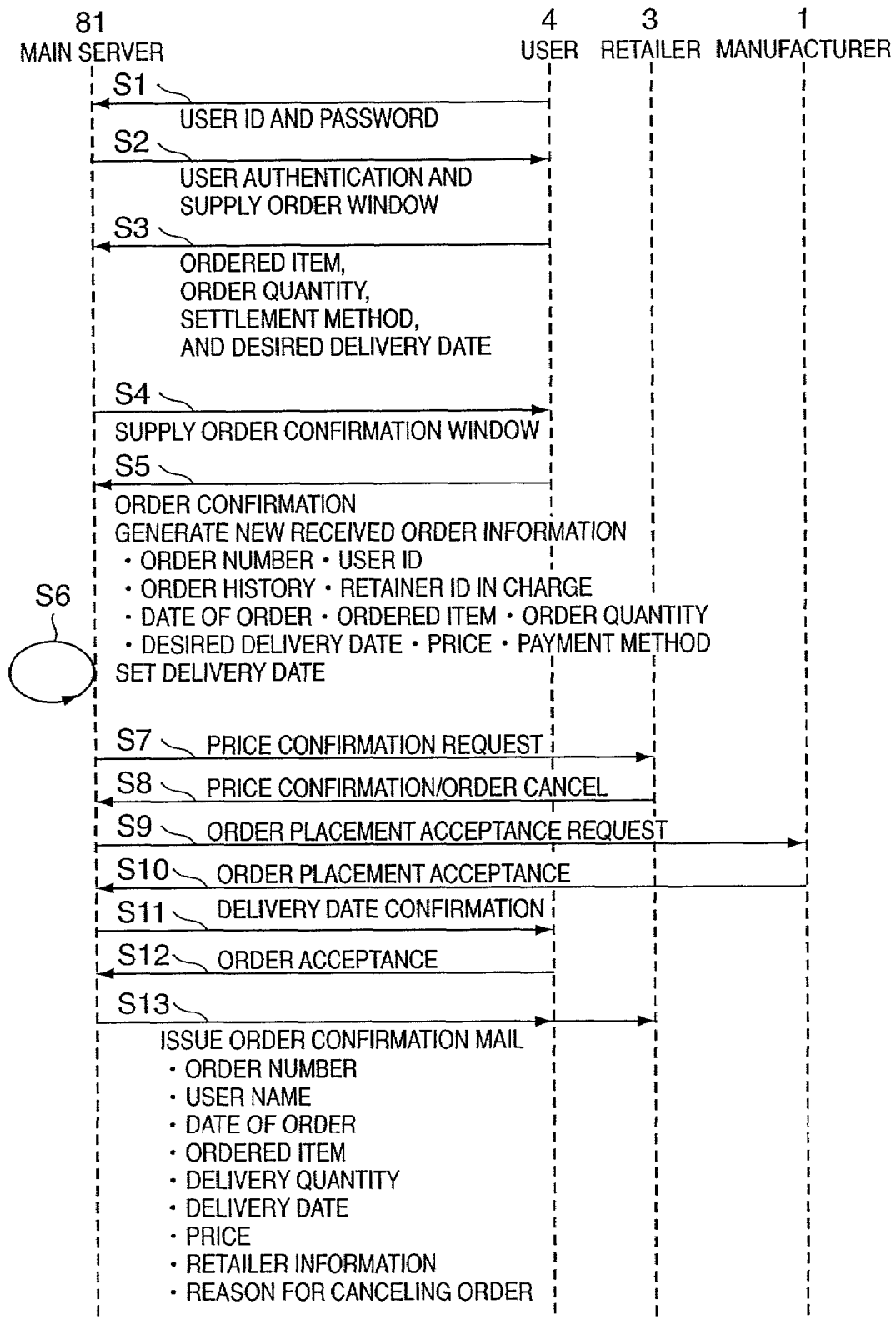
FIG. 4 shows an order placement sequence of a toner cartridge.

FIG. 4 shows the order placement sequence of toner cartridges, and FIGS. 5 to 12 show windows displayed on the terminal 41 of the user 4 upon placing an order of toner cartridges.

The user 4 accesses the main server 81 via the terminal 41. That is, the user 4 designates the Uniform Resource Locator (URL) of the main server 81 using software such as a Web browser which is running on the terminal 41. In response to this designation, the main server 81 sends data which corresponds to a login window and is described in Hyper Text Markup Language (HTML) (to be referred to as "HTML" data hereinafter) to the terminal 41, and the login window shown in FIG. 5 is displayed on the monitor of the terminal 41. Note that the HTML data may be described using an extensible Markup Language (XML).

The user 4 inputs a user ID corresponding to a customer number, and a password in step S1 shown in FIG. 4, and then presses an [OK] button to inform the main server 81 of the user ID and password. Note that each user (office or business establishment) is informed of the user ID and password in advance from the retailer 3.

Upon receiving the user ID and password, the main server 81 looks up the customer information database in step S2 to check if a user corresponding to the received user ID and password is present. If the corresponding user is present, the main server 81 generates HTML data corresponding to an order window via user authentication, and sends that data to the terminal 41. In this manner, the order window shown in FIG. 6 is displayed on the monitor of the terminal 41.

The order window shown in FIG. 6 is mainly made up of a list 101 of toner cartridges corresponding to apparatuses that the user uses, a settlement method select field 102, a delivery date designation field 103, and an application field 104 of request for recovery of used toner cartridges. Note that the delivery date designation field 103 preferably adopts a pull-down menu format, with which a field in [] in the following example is pulled down to allow the user to designate business days except for rest days and holidays. In this case, a corresponding message "designate desired delivery date using pull-down menu, and also AM/PM delivery time range" may be displayed.

(Example) delivery date [today] (June 30) ○AM ●PM

The list 101 displays the model numbers of toner cartridges, those of corresponding apparatuses, and prices, and includes input frames used to input order quantities for the respective model numbers of toner cartridges. Note that FIG. 6 shows only two types of toner cartridges. However, in practice, the model numbers of toner cartridges corresponding to all models such as printers, copying machines, facsimile apparatuses, and the like that the user uses are listed.

Information of the apparatuses that the user uses is acquired from the purchased product name field in the customer information database. The product information database can be searched for records having the product names or model numbers corresponding to this information, and the model numbers of toner cartridges can be extracted from the associated expendable field of those records.

After predetermined items are input in the order window, if a [submit] button is pressed, data of ordered items and quantities corresponding to the list 101, data of the settlement method corresponding to the select field 102, and data of the desired delivery date corresponding to the designation field 103 are sent to the main server 81 in step S3.

The main server 81 generates HTML data corresponding to an order confirmation window in accordance with the received data and flags and supplies that data to the terminal 41 in step S4. In this manner, an order confirmation window shown in FIG. 7 is displayed on the monitor of the terminal 41.

The user 4 checks the contents of the order confirmation window, and if the order contents are correct, he or she presses an [OK] button in step S5. If the displayed contents include any error or item to be corrected, the user presses a [Cancel] button. Upon depression of the [Cancel] button, the order window is displayed on the monitor of the terminal 41 again.

Upon receiving order confirmation, the main server 81 generates information indicating a newly received order. This information contains data of the order number, user ID, order history, retailer ID in charge, date of order, ordered items, order quantities, desired delivery date, prices, payment method, and the like.

The main server 81 checks an actual delivery date using the customer information database and warehouse information database on the basis of the desired delivery date of the customer in step S6. In this case, the main server 81 classifies orders by checking if the desired delivery date of each order of the customer is an urgent or normal one. The main server 81 reserves articles to be shipped from the most appropriate warehouse on the basis of the stock information of each branch warehouse, another order information, geographic information of each warehouse and destination, and the like. If the desired delivery date of the order of the customer is an urgent one, articles of another order which has already been temporarily reserved and has a non-urgent desired delivery date can be preferentially reserved for the current order.

The main server 81 sends the aforementioned received order information including a price confirmation request to the retailer 3 in charge of the user 4 in step S7. This is because the delivery price to the user is set by the retailer 3, and that price must be confirmed since it varies depending on the transaction condition with the user. The price confirmation request is immediately processed by software which is running on the terminal 31 of the retailer 3, and price confirmation or order cancel information is returned to the main server 81 in step S8. This price confirmation request is sent to the portable terminal 32 of a sales person in charge of the user, and price confirmation or order cancel information is returned by the sales person to the main server 81 via the portable terminal 81 in step S8.

Upon receiving price confirmation, the main server 81 immediately sends the received order information including an order placement acceptance request to the manufacturer 1 in step S9. This order acceptance request immediately undergoes an acceptance process by software which is running on the terminal 13 of the manufacturer 1 or by an operator who manages the terminal 13, and order placement acceptance is normally returned to the main server 81 in step S10. If any price error is found and information indicating order cancel is received, the status of the corresponding received order information is changed to a format "cancel".

In step S11, delivery date information is sent to the user. If shipping can be made according to the desired delivery date of the user, the delivery date is settled in this step. However, if shipping cannot be done according to the desired delivery date, the user selects delivery date change acceptance or order cancel on a predetermined window shown in FIG. 11. This user information is sent to the main 20 server 81 in step S12.

Figure 10:
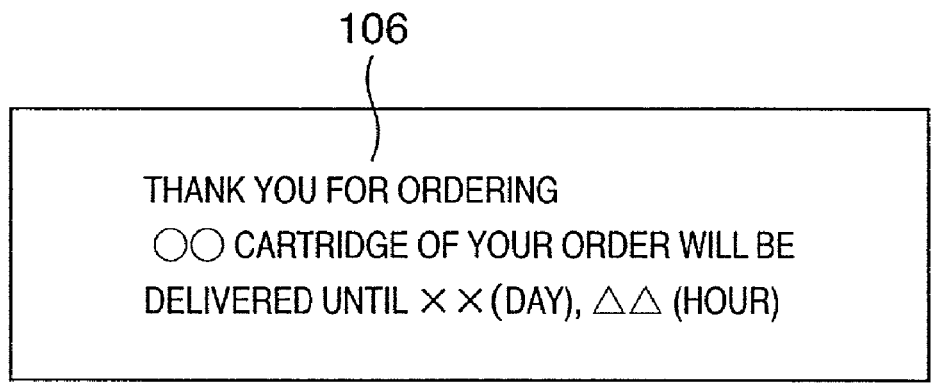

If shipping can be made according to the delivery date, or if delivery date change has been accepted in step S12, the main server 81 displays a user login window shown in FIG. 10 using HTML data, generates an e-mail message indicating order confirmation, and sends that e-mail message to the user 4 and retailer 3. This e-mail message contains information such as the order number, user name, date of order, ordered items, delivery quantities, delivery date, prices, information of the retailer 3 (name, address, telephone number, and FAX number), and the like.

On the other hand, if the status of the received order information indicates order cancel, the main server 81 displays a user login window shown in FIG. 12 using HTML data, generates an e-mail message indicating order cancel confirmation, and sends that e-mail message to the user 4 and retailer 3. This e-mail message contains information such as the order cancel reason, order number, user name, date of order, ordered items, delivery quantities, delivery date, prices, information of the retailer 3 (name, address, telephone number, and FAX number), and the like.

In this way, the toner cartridge order placement sequence ends. Although not shown in FIG. 4, after the user 4 sends order confirmation in step S5, a window used to select continuation of another order, re-conformation of order contents, or end of order (logout) is displayed on the monitor of the terminal 41 of the user 4, as shown in FIG. 8. If the user 4 presses a [logout] button, connection between the main server 81 and terminal 41 is disconnected.

[Process of Main Server]

The typical process to be executed by the main server 81 will be explained below.

Order reception process

Figure 13:
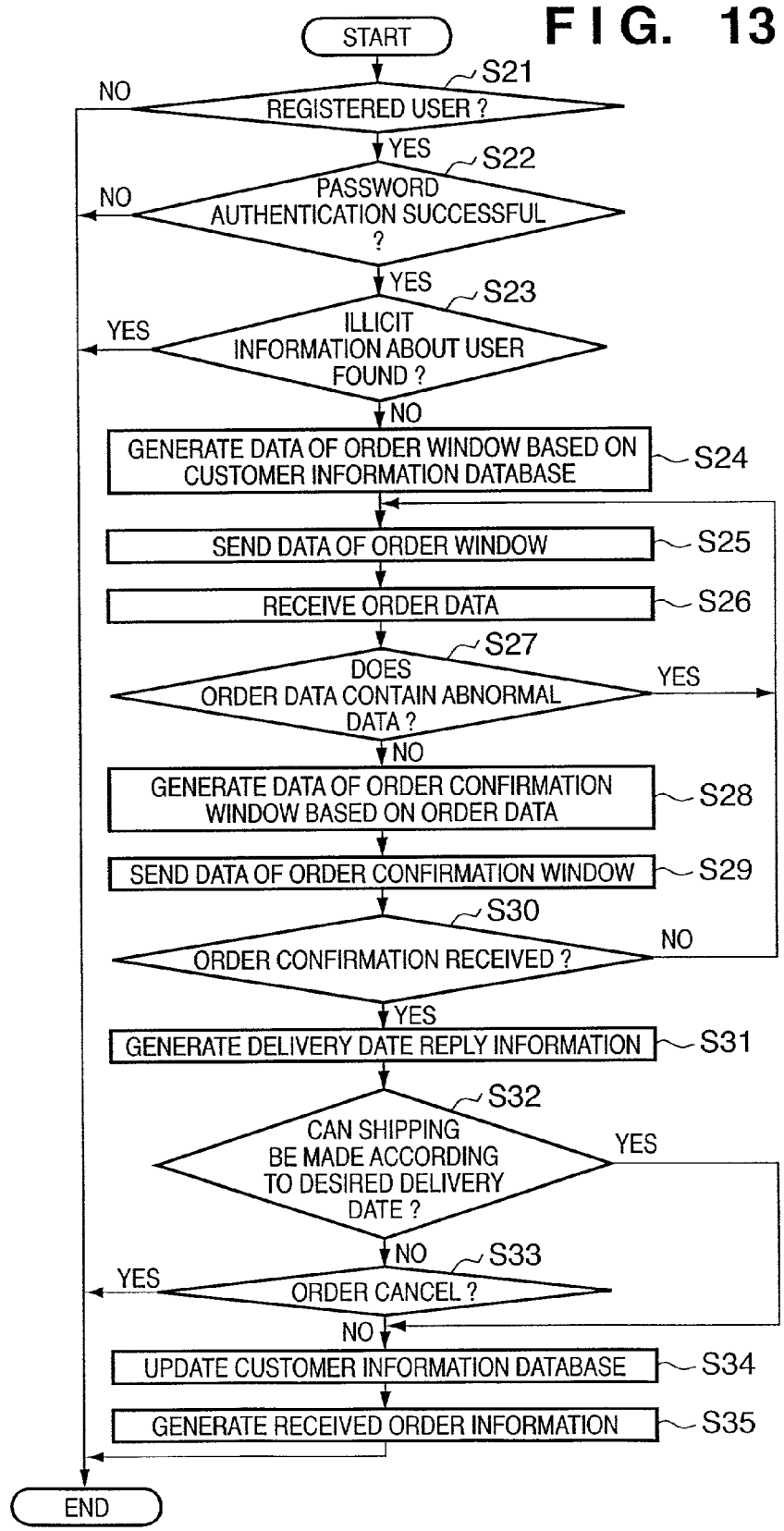
FIG. 13 is a flow chart showing an order reception process.

FIG. 13 is a flow chart showing the order reception process, which corresponds to the order placement sequence shown in FIG. 4.

Upon receiving the user ID and password from the user 4, the main server 81 checks in step S21 based on the customer information database if the user of interest is a registered user, and authenticates the password in step S22. If the user of interest is the registered user and password authentication has succeeded, the main server 81 checks in step S23 based on the customer information database if illicit information about the user 4 is found. If no such information is found, the main server 81 generates HTML data of the order window in step S24. More specifically, the main server 81 generates the list 101 and select field 102 shown in FIGS. 6 and 9 in accordance with the user ID, and determines if the participation application field 104 shown in FIG. 6 or a display field 105 shown in FIG. 9 is displayed. The generated HTML data of the order window is sent to the user 4 in step S25.

If the user of interest is not a registered user, if password authentication has failed, or if any illicit information about the user 4 is found, the process ends.

Upon receiving order data in step S26, the main server 81 checks in step S27 if the order data contains abnormal data. If any abnormal data is contained, the flow returns to step S25. If no abnormal data is contained, the main server 81 generates HTML data of the order confirmation window shown in FIG. 7 on the basis of the order data in step S28, and sends it to the user 4 in step S29.

Figure 11:
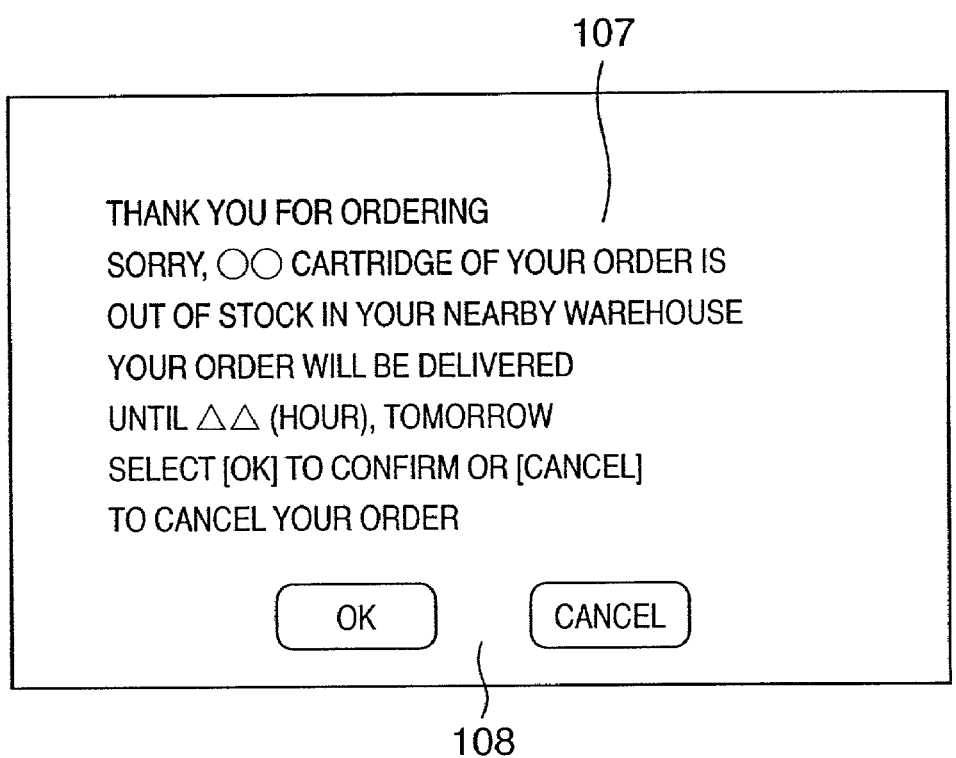

The main server 81 checks in step S30 if data indicating order confirmation is received. If data indicating cancel is received, the flow returns to step S25. If data indicating order confirmation is received, the main server 81 generates delivery date reply information in step S31, and checks in step S32 if shipping can be made according to the delivery date. Whether a confirmation window 106 shown in FIG. 10 or order confirmation fields 107 and 108 shown in FIG. 11 are to be displayed is determined depending on whether to ship according to the delivery date. Note that the detailed process that pertains to generation of delivery date reply information in step S31 will be explained later.

If shipping cannot be made according to the delivery date, the main server 81 generates data indicating whether or not the user wants to cancel the order in step S33. Upon receiving data indicating cancel, the process ends. If it is determined in step S32 that shipping can be made according to the delivery date, or if data indicating OK is received in step S33, the main server 81 updates the contents of a customer database (more specifically, order history and the like) in step S34, and generates received order information in step S35.

Delivery date confirmation & shipping process

Figure 14:
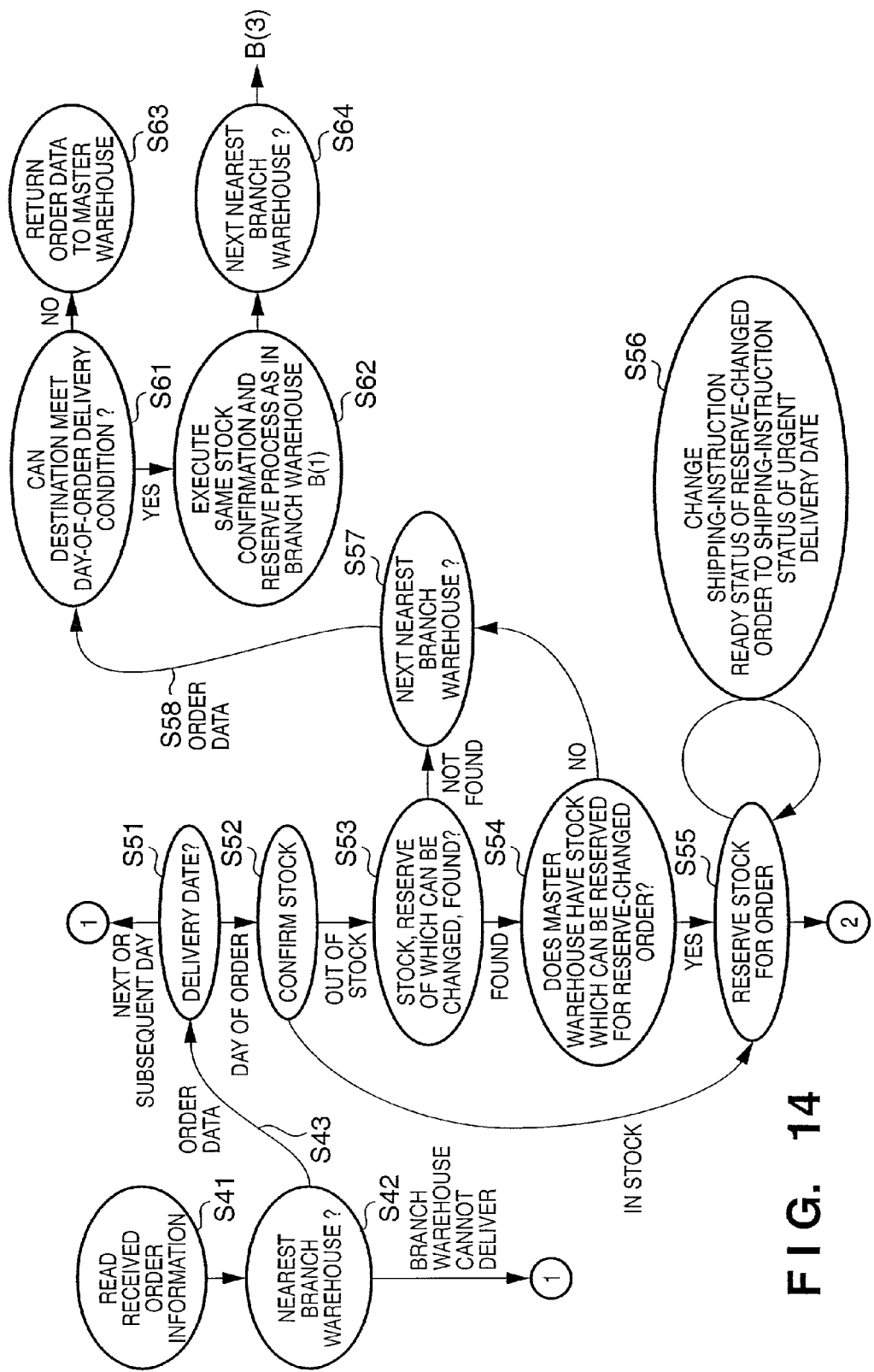
FIGS. 14 to 16 are charts showing stock confirmation, delivery date reply, and shipping processes on the basis of received order information.
Figure 15:
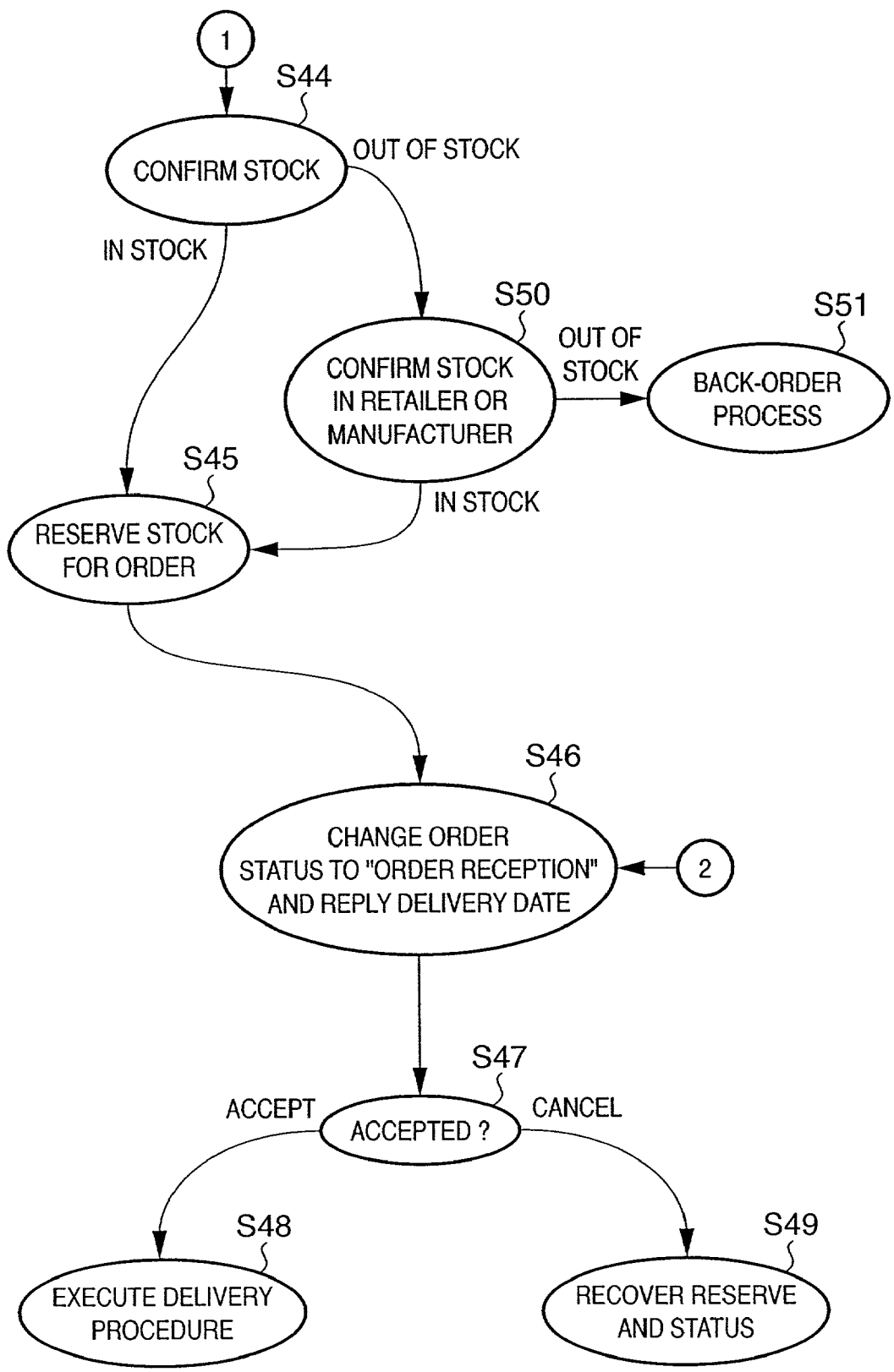
Figure 16:
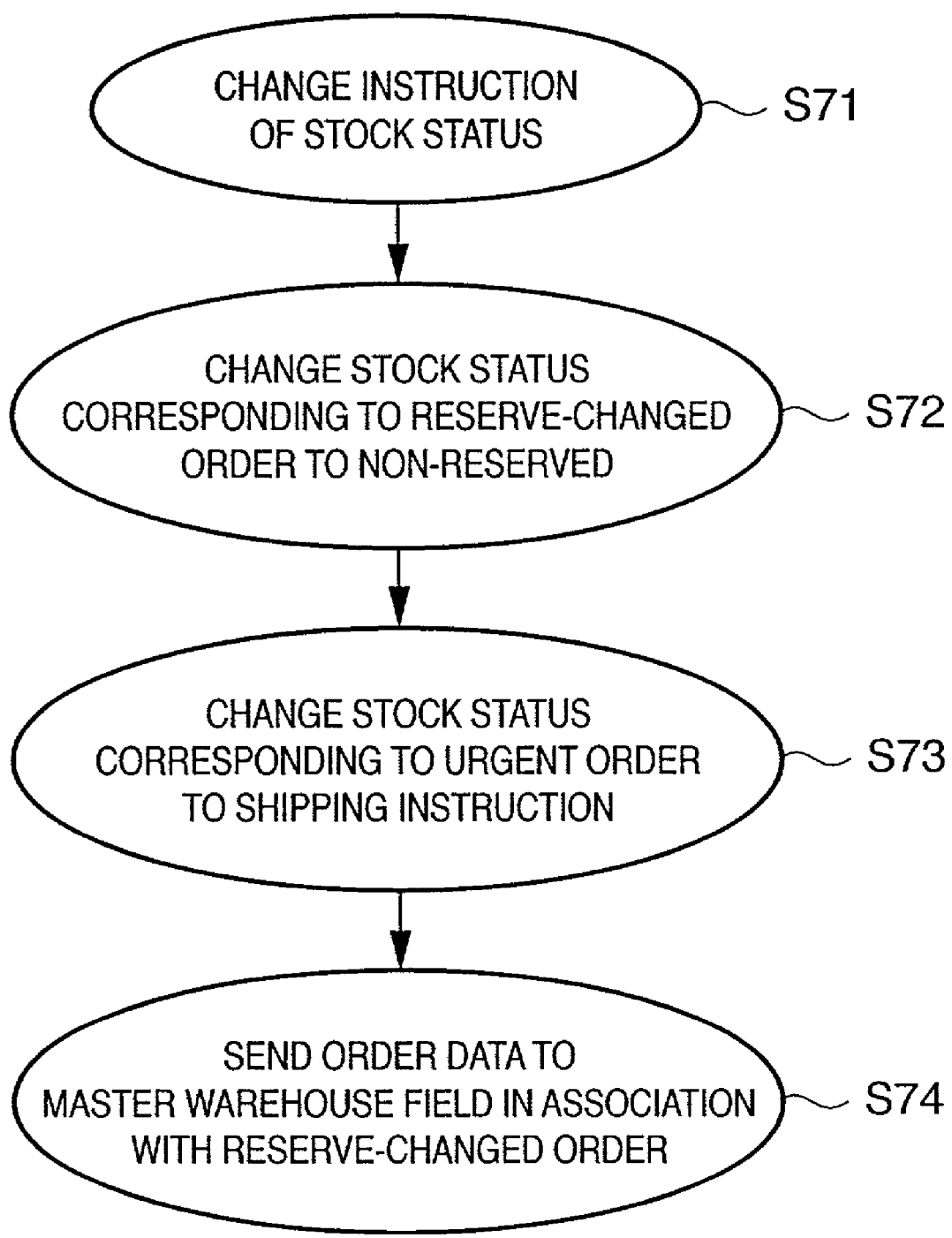

FIGS. 14 to 16 show the stock confirmation, delivery date reply, and shipping processes based on the received order information, based on which the aforementioned delivery date reply information is generated. Note that a process corresponding to the master warehouse and that corresponding to each branch warehouse are executed as a combined process by the main server 81 in practice. Alternatively, such processes may be implemented as independent processes executed by the master and branch warehouses 5 and 6 which are connected via a network.

In step S41, one received order information is read. A delivery date confirmation & shipping process starts based on the user ID, ordered items, and order quantities recorded in the received order information.

In step S42, the nearest branch warehouse 6 B(1) is checked with reference to the nearest branch warehouse #1 field corresponding to the user ID to determine a delivery date using the customer information database and warehouse information database with respect to the desired delivery date of the customer. In step S43, order data is sent to the branch warehouse 6 B (1) indicated by the nearest branch warehouse #1 field.

Upon receiving the order data, the branch warehouse 6 B(1) checks in step S51 if the customer's desired delivery date is an urgent one (e.g., day-of-order delivery) or normal. If the desired delivery date of the order is an urgent one, it is checked with reference to the warehouse-by-warehouse stock information field in step S52 if the ordered items are stocked in order quantities in the branch warehouse 6 B(1) to have reservable status. If a reservable stock is found, that stock is reserved for the order in step S55.

If no reservable stock is found, it is checked in step S53 if reserve for the already reserved stock can be changed. For example, reserve for a stock which is reserved for another order with a non-urgent delivery date (to be referred to as a "reserve-changed order" hereinafter) can be changed. If reserve can be changed, it is checked in step S54 if the master warehouse 5 has a stock that can be reserved for the reserve-changed order. If the master warehouse 5 has a stock that can be reserved for the reserve-changed order, that stock is reserved for the order in step S55, and shipping instruction ready status of the reserve-changed order is changed to shipping-instruction status of the urgent delivery date in step S56.

Normally, if the branch warehouse 6 B(1) registered in the nearest branch warehouse #1 field has a stock, ordered items can be delivered within a short term.

If no reservable stock is found in the branch warehouse 6 B(1) even after the aforementioned steps, the branch warehouse 6 B(2) next nearest to the user's address is checked in step S57 with reference to the branch warehouse field #2 corresponding to the user ID using the warehouse information database. In step S58, the order data is sent to the branch warehouse 6 B(2) indicated by the branch warehouse #2 field.

Upon receiving the order data, the branch warehouse 6 B(2) checks in step S61 if the destination meets a day-of-order delivery condition.

Figure 17:
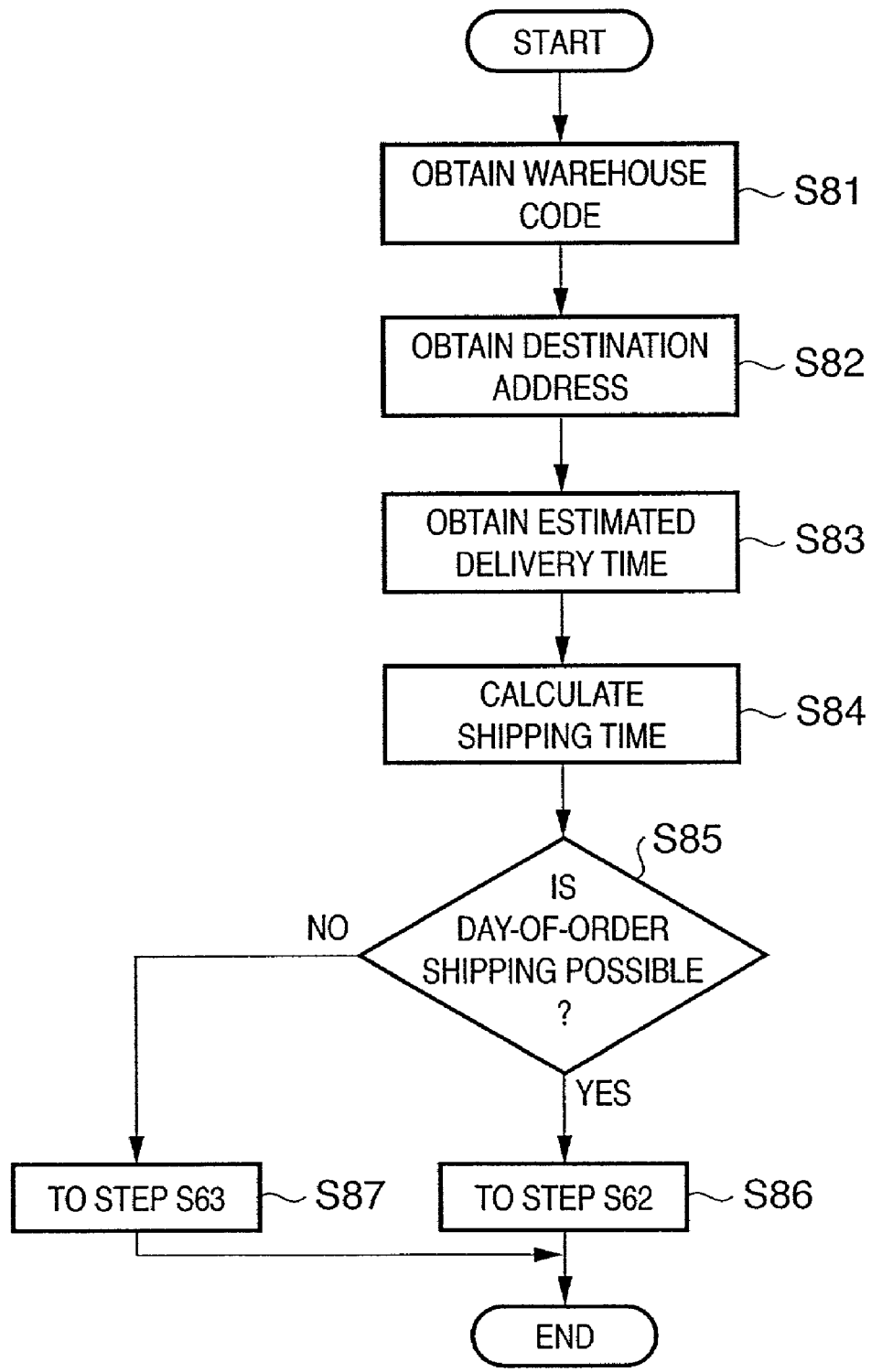
FIG. 17 is a flow chart for explaining a process for checking if a day-of-order delivery condition is met.

FIG. 17 is a flow chart for explaining the process for checking in step S61 if day-of-order delivery condition is met.

A warehouse code is acquired in step S81, the destination address is obtained in step S82, and an estimated delivery time as an estimation value of the time required to deliver articles from the warehouse to the destination is acquired from the estimated delivery time table in the warehouse database shown in FIG. 18. A shipping time indicating the shipping time limit of ordered articles is calculated in step S84 based on the estimated delivery time, and it is checked in step S85 based on the shipping time limit and current time if the day-of-order delivery condition can be met. If the day-of-order delivery condition can be met, the flow advances from step S86 to step S62; otherwise, the flow advances from step S87 to step S63.

The destination address can use, e.g., a 7-digit postal code or the like. Also, as for the estimated delivery time, actually measured values and data of VICS (Vehicle Information and Communication System) and the like are accumulated for respective days of week and time bands upon delivering articles, thus accumulating more accurate estimated values. Upon calculating the shipping time, it must be considered that a delivery which delivers the articles goes via other warehouses and other destinations.

If the day-of-order delivery condition can be met, the same stock confirmation & reserve process as in the branch warehouse 6 B(1) is executed in step S62. If the day-of-order delivery condition cannot be met, the order data is returned to the master warehouse 5 (master warehouse field) in step S63.

If no reservable stock is found, the order data is sent to the branch warehouse 6 B(3) the next nearest to the user's address in step S64.

If no branch warehouse that can satisfy the day-of-order delivery condition is found from the branch warehouse #x (x=1 to n) fields, the order data is returned to the master warehouse 5 (master warehouse field).

Upon receiving the returned order data, the master warehouse 5 checks based on the stock information field in step S44 if a reservable stock is found. If a reservable stock is found, that stock is reserved for the order in step S45.

If a reservable stock is found in the branch warehouse 6 or master warehouse 5, after stock status is changed to "shipping instruction" in step S55 or S45, order status is changed to "order received" in step S46, and the customer's delivery date confirmation window (FIG. 12) and delivery date reply information in FIG. 13 are updated to send a delivery date reply. If the customer checks the delivery date reply (S47) and accepts it, a delivery procedure (shipping instruction, update received order information (set a delivered flag ON or the like), a stock move process, and the like) is executed in step S48. If the customer cancels the order by checking the delivery date reply, the changed reserve and status are recovered in step S49, thus ending the process.

If no reservable stock is found in step S44, a process for searching the retailer 3 and manufacturer 1 for a reservable stock is executed in step S50. If the retailer 3 has a reservable stock, a delivery request is sent to the retailer 3. In response to this request, the retailer 3 makes, e.g., a service person deliver ordered items. In this case, whether or not ordered items corresponding to the received order information have been delivered can be checked based on information input from the mobile terminal 32 of the service person. If no stock is found even in the manufacturer 1, a back-order procedure and update of received order information are made (S51).

If the desired delivery date of the customer's order is not an urgent one (day-of-order), it is checked in step S44 based on the warehouse-by-warehouse stock information field if the branch warehouse 6 B(1) has a reservable stock. If no reservable stock is found in the branch warehouse 6 B(1), the order data is sent to the master warehouse field to check based on the stock information field if a reservable stock is found. If a reservable stock is found, its stock status is changed to "shipping-instruction ready" in step S45.

If a reservable stock is found in the branch warehouse 6 or master warehouse 5, after stock status is changed to "shipping-instruction ready" in step S45, the order status is changed to "order received" in step S46, and the customer's delivery date confirmation window (FIG. 12) and delivery date reply information in FIG. 13 are updated to send a delivery date reply. If the customer checks the delivery date reply (S47) and accepts it, a delivery procedure (shipping instruction, update received order information (set a delivered flag ON or the like), a stock move process, and the like) is executed in step S48. If the customer cancels the order by checking the delivery date reply, the changed reserve and status are recovered in step S49, thus ending the process.

If no reservable stock is found in step S44, a process for searching the retailer 3 and manufacturer 1 for a reservable stock is executed in step S50. If the retailer 3 has a reservable stock, a delivery request is sent to the retailer 3. In response to this request, the retailer 3 makes, e.g., a service person deliver ordered items. In this case, whether or not ordered items corresponding to the received order information have been delivered can be checked based on information input from the mobile terminal 32 of the service person. If no stock is found even in the manufacturer 1, a back-order procedure and update of received order information are made (S51).

As described above, order status may be changed by an urgent order. In this case, upon receiving an order status change instruction in step S71, stock status (shipping-instruction ready) corresponding to the reserve-changed order is changed to "not reserved" in step S72, and stock status (not reserved) corresponding to the urgent order is changed to "shipping instruction" in step S73. As for the reserve-changed order, the order data is sent to the master warehouse field in step S74. If no order status change instruction is received in step S71, stock status is changed from "shipping-instruction ready" to "shipping instruction" at a set time.

Second Embodiment

An expendable sales system according to the second embodiment of the present invention will be explained below. In the second embodiment, the same reference numerals denote substantially the same building components as in the first embodiment, and a detailed description thereof will be omitted.

In the following description, the number of branch warehouses is assumed to be one, and an expendable is limited to toner cartridge A CRG for printer LBP A for the sake of simplicity. However, it will be easy to understand for those who are skilled in the art that various kinds of expendables can be handled in a plurality of branch warehouses by executing the following processes as well as article names and model numbers of expendables for respective branch warehouses.

FIG. 20 shows an order window in the second embodiment, which includes a field 111 which allows the user to set day-of-order delivery in the order window shown in FIG. 6. Note that the day-of-order delivery can be set after the required expendables and quantities are designated. In the example shown in FIG. 20, A CRG and quantity=1,000 have already been designated.

If the user who wants urgent delivery presses a [day-of-order] button 112, the date of order is automatically input to the delivery date input field. Note that the date information of the [day-of-order] button 112 is updated every time the order window is supplied from the main server 81 to the user terminal 41, and that update mechanism may use a timepiece function of the main server 81 or user terminal 41.

Figure 3:
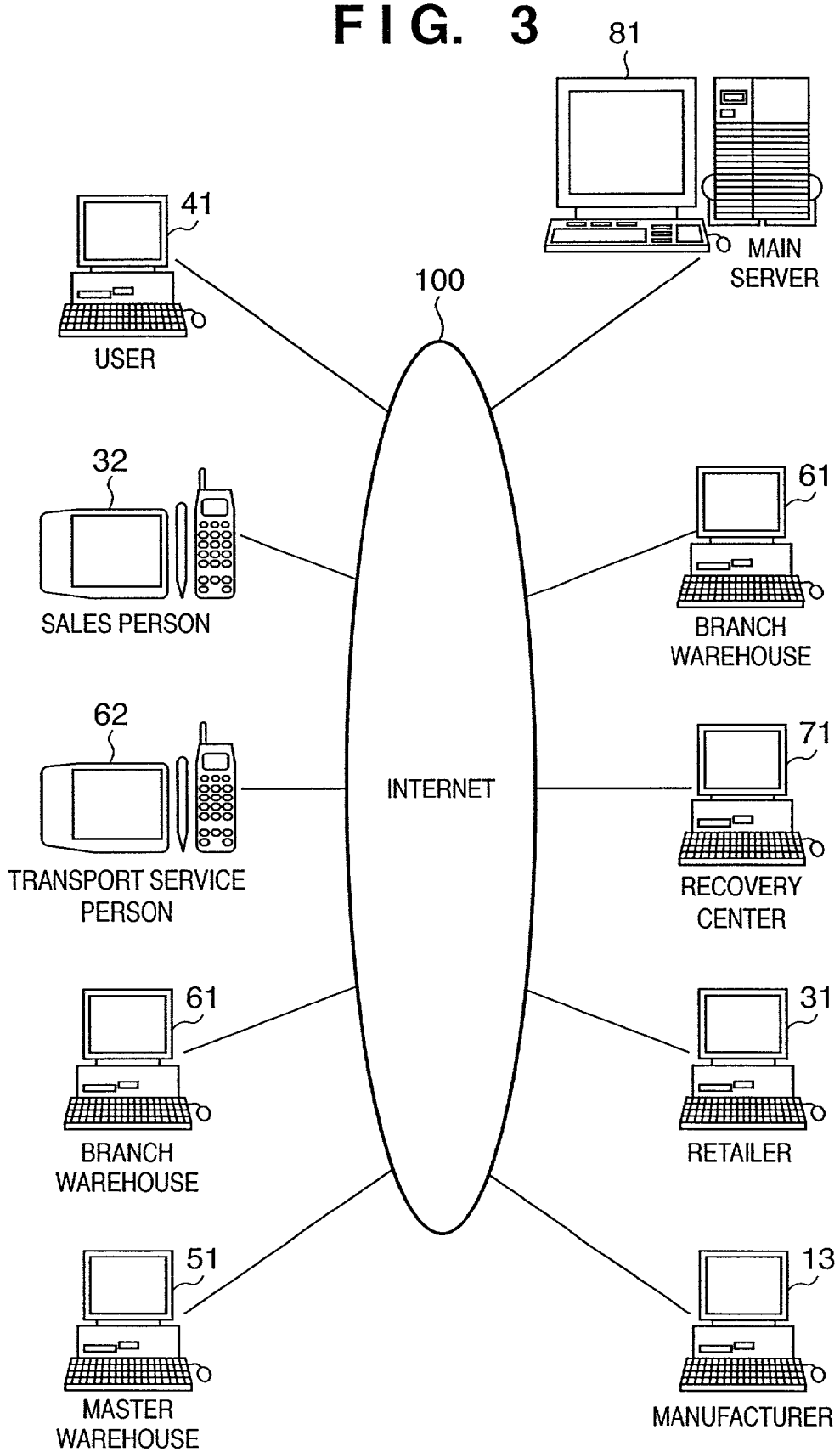
FIG. 3 is a view showing the arrangement of a sales/recovery system of a toner cartridge.
Figure 21A:
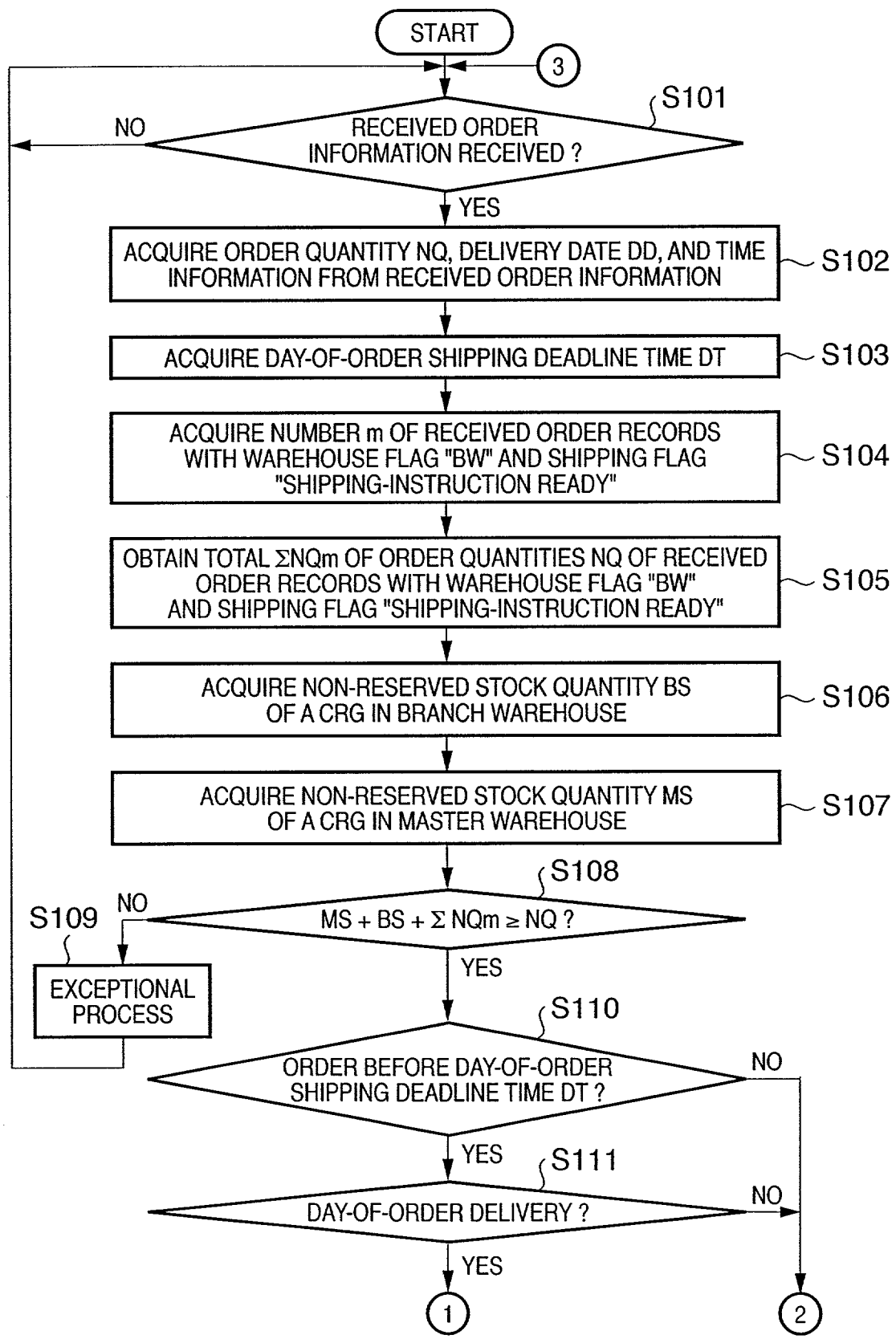
FIG. 21A to 21C are flow charts showing stock confirmation, delivery date reply, and shipping processes based on received order information.
Figure 21B:
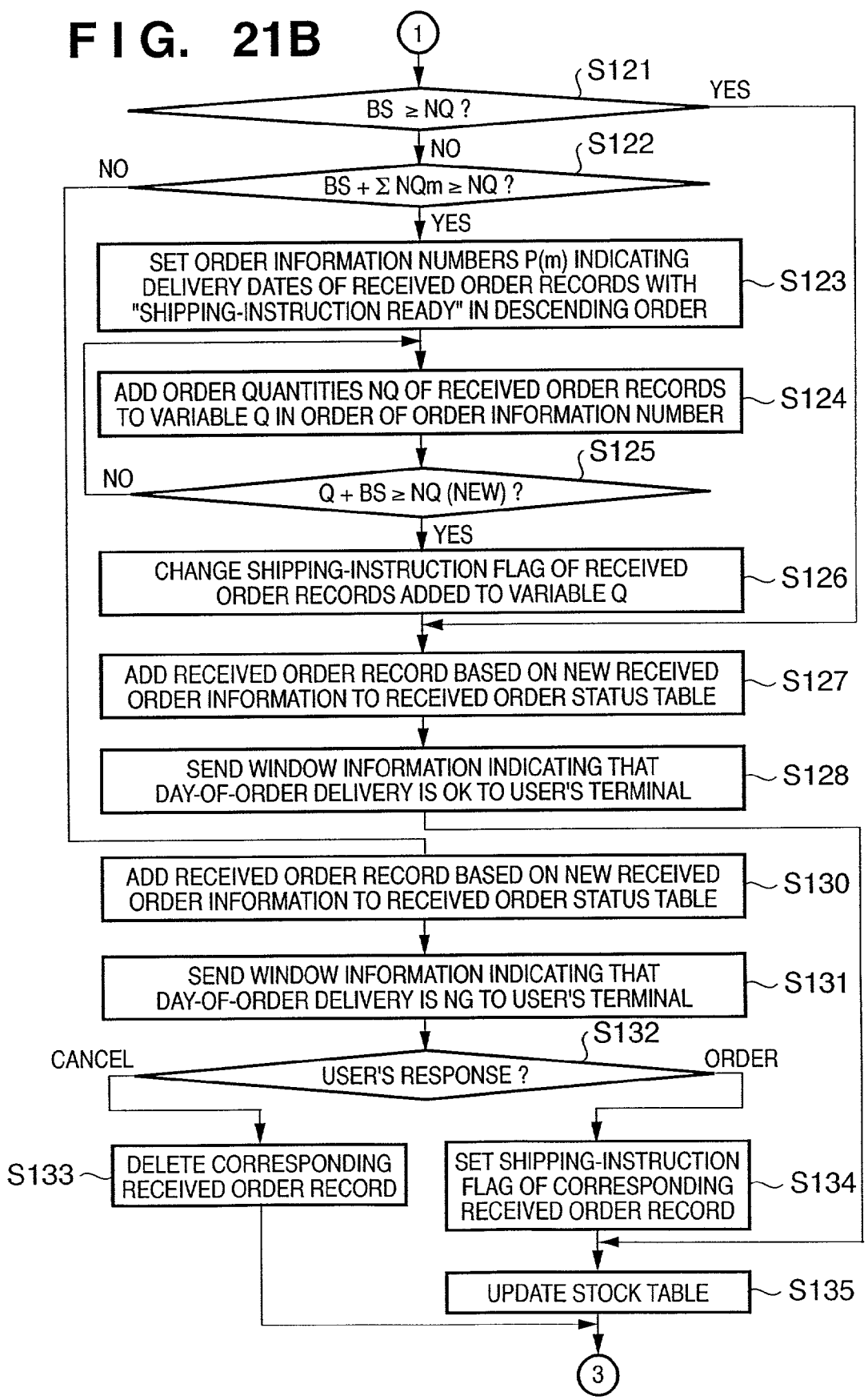
Figure 21C:
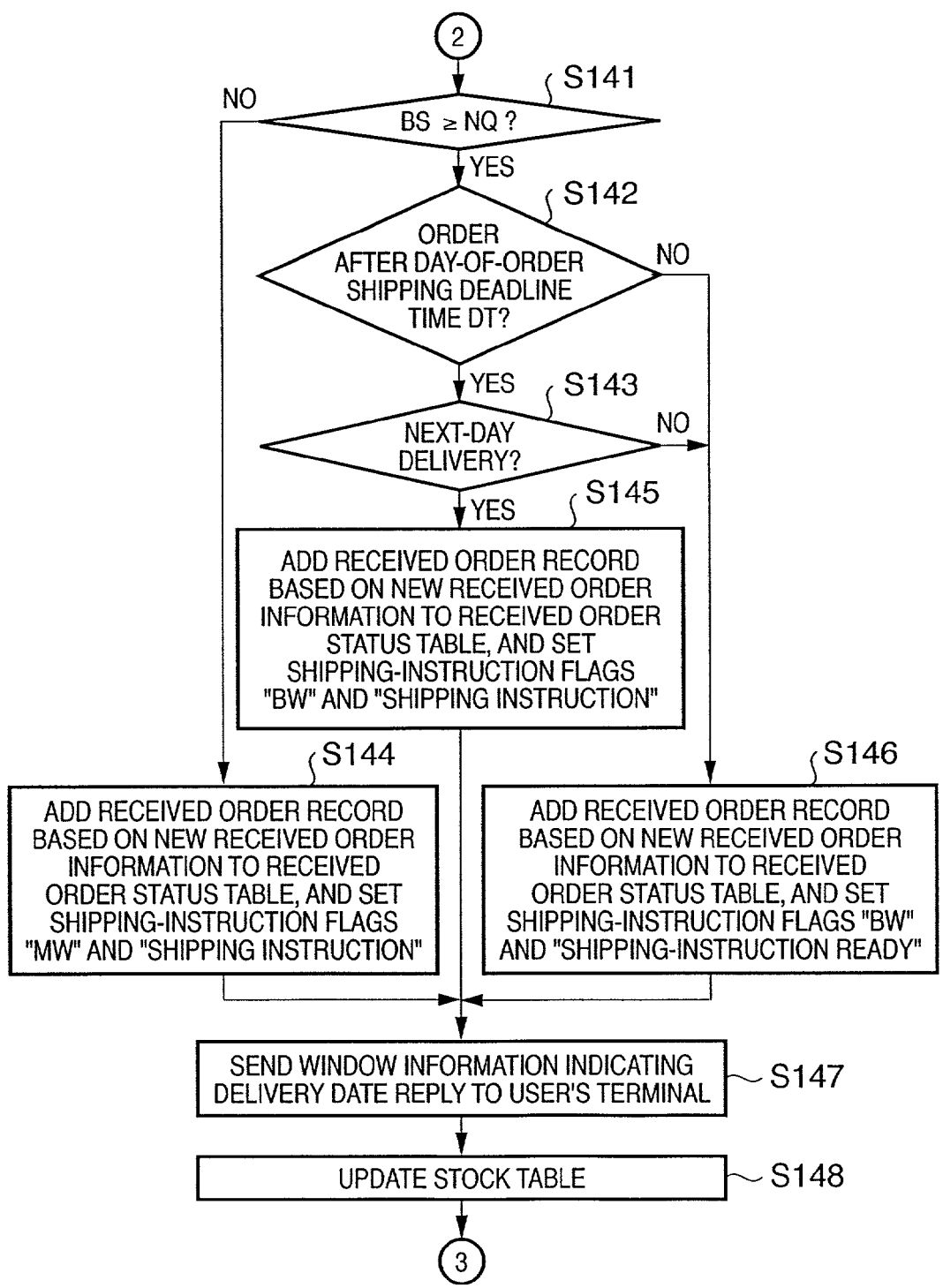

FIGS. 21A to 21C are flow charts showing stock confirmation, delivery date reply, and shipping processes based on received order information, which processes are executed by the main server 81 shown in FIG. 3.

Upon receiving new order information from the remote user terminal 41 via a communication line such as a public line or the like (S101), order quantity NQ, delivery date DD, time information (including date of order placement PD and order placement time PT), and article type (not shown) are acquired from the received order information shown in FIG. 22 (S102), and a day-of-order shipping deadline time DT or the like indicating a day-of-order shipping deadline is acquired (S103).

By looking up an A CRG received order status table in a database shown in FIG. 23A on the basis of the article type information acquired from the received order information shown in FIG. 22, the number m of received order records which have warehouse flags "BW" and shipping flags "shipping-instruction ready" in their shipping-instruction field is acquired (step S104). Note that the warehouse flag "BW" indicates a stock in the branch warehouse, and "MW" indicates a stock in the master warehouse. At this time, the received order information is not registered in the received order status table.

Subsequently, a total $\Sigma NQm$ (to be referred to as "shipping-instruction ready stock quantity" hereinafter) of order quantities NQ of received order records with shipping flags "shipping-instruction ready" is acquired (S105). In the example in FIG. 23A, $\Sigma NQm=1700$.

By looking up an A CRG stock table in a database shown in FIG. 24A, a non-reserved A CRG stock quantity BS of in the branch warehouse is acquired (S106), and a non-reserved A CRG stock quantity MS in the master warehouse is acquired (S107). In the example in FIG. 24A, BS=0, and MS=10000.

Upon recognizing the A CRG stock quantity with the above process, the sum of the sum MS+BS of non-reserved stock quantities in the master and branch warehouses and the shipping-instruction ready stock quantity $\Sigma NQm$ (to be referred to as "shippable quantity NE" hereinafter) is compared with the order quantity NQ of newly received order information (S108).

If NE<NQ, since it is impossible to execute a normal process, an exceptional process is executed (S109), and the flow returns to step S101. Normally, since the master warehouse has a sufficient stock, the probability of generation of an exceptional process is very small. The exceptional process includes a back-order process, delivery date adjustment, production control, and the like.

On the other hand, if NE>NQ, the flow branches depending on the comparison results between the day-of-order shipping order deadline time DT and order placement time PT (S110) and between the delivery date DD and date of order placement PD (S111). That is, it is checked if the order was placed before the day-of-order shipping order deadline time DT and day-of-order delivery (DD=PD) is set. If day-of-order delivery is set, the flow branches to the process shown in FIG. 21B; otherwise, the flow branches to the process shown in FIG. 21C.

[In case of day-of-order delivery]

In case of day-of-order delivery, the flow branches to the process shown in FIG. 21B, and the flow then branches depending on the comparison results between the non-reserved A CRG stock quantity BS in the branch warehouse and the order quantity NQ of the new received order information (S121) and between the sum of the non-reserved stock quantity BS and shipping-instruction ready stock quantity $\Sigma NQm$, and the order quantity NQ of the new received order information (S122).

That is, if BS>NQ, some or all of A CRG as a non-reserved stock in the branch warehouse can be reserved for the new order and, in this case, the flow jumps to step S127. On the other hand, if BS<NQ and BS+$\Sigma NQm$>NQ, the flow advances to step S123 to re-reserve A CRG, which has already been reserved for the received order records with stock flags "shipping-instruction ready" again for the new order. Otherwise (BS+$\Sigma NQm$<NQ), the quantity of A CRG which can be reserved (re-reserved) for the new order in the branch warehouse is smaller than the order quantity NQ of the new received order information, and at least deficient quantity of A CRG must be sent out from the master warehouse. In such case, the flow jumps to step S130.

If BS<NQ and BS+$\Sigma NQm$>NQ, order information numbers P(m) that indicate the delivery dates of the received order records with shipping flags "shipping-instruction ready" in descending order are set (S123), as shown in FIG. 23B, in order to re-reserve A CRG which has already been reserved for the received order records with "shipping-instruction ready". The order quantities NQ are added to a variable Q in the order of order information numbers, i.e., descending order of delivery date (S124), and addition in step S124 is repeated until the sum of the sum Q (ΣNQ) and non-reserved stock quantity BS becomes equal to or larger than the order quantity NQ (INQ+BS>NQ) (S125). Note that P(2) and P(3) shown in FIG. 24B have day-of-order delivery dates, and the delivery date of P(3) is earlier than that of P(2) (not shown).

If INQ+BS>NQ, the warehouse flags of the received order records added to the variable Q are changed to "MW" and the shipping flags are changed to "shipping instruction" (S126). If the order quantity NQ of the new received order is 1000, since ΣNQ 1100 when the order quantities NQ of the received order records P(1) and P(2) shown in FIG. 25 are added, the shipping-instruction flags of received order records with order numbers 123-3 and 123-4 are changed, as shown in FIG. 23C, and a process for transporting A CRG in quantity corresponding to these received order records from the master warehouse to the branch warehouse is done. Note that the process from steps S123 to S126 is called an "urgent process".

In the above description, the order information numbers P(m) are sorted using the delivery dates as a parameter. However, any other sorting methods may be used as long as they are efficient. For example, when priority attribute information is appended to each order information, the process in step S123 may be done based on the priority attribute information. With this method, even if there are a plurality of pieces of received order information with the same delivery date, the received order information to be processed in step S125 can be easily selected based on the priority attribute information.

Upon completion of the urgent process, or if BS>NQ, a received order record based on the new received order information is added to the received order status table (S127). As shown in FIG. 23D, the shipping-instruction flags of the received order record to be added are set to be "BW" and "shipping instruction".

Subsequently, window information indicating that day-of-order delivery is OK (FIG. 25) is sent to the user's terminal 41 (S128), and the stock table is updated (S135), as shown in FIG. 24B, since the shipping instruction flags have been changed and/or the received order record has been added.

Since the processes of S121 to S127 are executed by the determination of S111 in the case of day-of-order delivery, the following process is realized. That is, the stock reserved for shipping information is re-reserved for the received order information with high urgency level in descending order of shipping timing, and this process is repeated until the order quantity is satisfied.

On the other hand, if BS+ΣNQm<NQ, a received order record based on the new received order information is added to the received order status table (S130), and window information indicating that day-of-order delivery is NG (FIG. 26) is sent to the user's terminal 41 (S131), and a user's response is checked (S132). If the user's response is "cancel", the corresponding received order record is deleted from the received order status table (S133); if the user's response is "order", the shipping-instruction flags of the corresponding received order record are set to be "MW" and "shipping instruction" (S134) and the stock table is updated (S135), as shown in FIG. 23E. After that, the flow returns to step S101.

With the process in step S125, management of the stock database that considers the urgency level appended to the received order information for which a stock has already been reserved can be implemented. Also, with the processes in steps S128 and S131, an appropriate result that has undergone various stock check processes in steps S108, S121, S122, and S125 can be immediately sent to the user terminal 41.

[In Case of Delivery Date Corresponding to Next or Subsequent Day]

In case of the delivery date corresponding to the next or subsequent day, the flow branches to the process shown in FIG. 21C, and also branches depending on the comparison result between the non-reserved A CRG stock quantity BS in the branch warehouse and the order quantity NQ of the new received order information (S141), the result of checking as to whether or not the order was placed after the day-of-order shipping deadline time DT (S142), and the result of checking as to whether or not next-day delivery is set (S143).

If BS<NQ, a received order record based on the new received order information is added to the received order status table, and the shipping-instruction flags are set to be "MW" and "shipping instruction" (S144) so as to ship A CRG in quantity corresponding to the received order record from the master warehouse to the branch warehouse.

If BS>NQ, the order is placed after the day-of-order shipping deadline time DT, and the next-day delivery is set, a received order record based on the new received order information is added to the received order status table, and the shipping-instruction flags are set to be "BW" and "shipping instruction" (S145). Since the day-of-order shipping deadline time DT has passed, a stock reserved for this received order record is never re-reserved for the subsequent received order by the urgent process.

Otherwise, a received order record based on the new received order information is added to the received order status table, and the shipping-instruction flags are set to be "BW" and "shipping-instruction ready" (S146).

Subsequently, window information indicating a delivery date reply (FIG. 27) is sent to the user's terminal 41 (S147), and the stock table is updated (S148) since the shipping-instruction flags have been changed and/or the received order record has been added. After that, the flow returns to step S101.

In the above description, expendables in required quantity are transported from the master warehouse to the branch warehouse, e.g., when the quantity of the non-reserved stock in the branch warehouse is smaller than the order quantity. In consideration of transport efficiency, after expendables are transported from the master warehouse to the branch warehouse, they are preferably delivered from the branch warehouse to the delivery location designated by the user (customer). However, in consideration of the order quantity and the relationship between the master warehouse and delivery location, expendables may be directly delivered from the master warehouse to the delivery location.

Since the processes shown in FIGS. 21A and 21B are implemented in this way, when the received order information shown in FIG. 22 is input from the user terminal 41 to the system of this embodiment via a communication line, stock reserve control on the basis of the discrimination result of the urgency level of the new received order information and the comparison result between the order quantity of the new received order information and non-reserved stock quantity can be implemented.

In this case, the urgency level of the new received order information is checked. If it is determined that the new received order information has high urgency level, it is then checked if the non-reserved stock quantity is larger than the order quantity of that order. If it is determined that the non-reserved stock quantity is deficient, shipping information with low urgency level is extracted from the stock database, and it is then checked if the sum of the stock quantity reserved for the extracted shipping information and the non-reserved stock quantity is larger than the order quantity of the received order information with high urgency level.

Other Embodiment

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the aforementioned sequence shown in FIG. 4 and/or the flow charts shown in FIGS. 13 to 16 and FIGS. 21A to 21C, and/or program codes used to generate data of windows shown in FIGS. 5 to 12, FIG. 20, and FIGS. 25 to 27.

As many apparently widely different embodiments of the present invention can be made without departing from the spirit and scope thereof, it is to be understood that the invention is not limited to the specific embodiments thereof except as defined in the appended claims.

What is claimed is:

1. A server apparatus comprising:
a receiver, arranged to receive received order information which is received from an information processing apparatus via a communication line and which contains at least information indicating an order quantity of an article, order placement date and time, and a delivery date; and
a controller, arranged to control stock reserve of an article using a received order status table into which the order placement date and time, the order quantity, the delivery date, and shipping instruction flags are recorded in a unit of an order number, wherein the shipping instruction flags include a warehouse flag indicating whether the article is stocked in a branch warehouse or master warehouse, and a shipping flag indicating whether shipment of the article is ready or instructed,
wherein if the delivery date of the received order information is today, said controller executes a first determination comprising the step of determining whether or not a non-reserved quantity of the article stocked in the branch warehouse and/or the master warehouse is equal to or greater than an order quantity of an article,
wherein if the non-reserved quantity of the article is less than the order quantity of the article, said controller executes a second determination comprising the steps of (a) determining whether or not reservation of the article, which is stocked in a first branch warehouse nearest an address of a customer of a first order information and which has been reserved for a second order information, is changeable and (b) determining whether or not the master warehouse is stocked with the article which can be reserved for the second order information,
wherein said controller, if the reservation is not changeable, or the reservation is changeable and the master warehouse is not stocked with the article which can be reserved for the second order information in the second determination, executes a third determination comprising the steps of (a) determining whether or not reservation of the article, which is stocked in a second branch warehouse near to the address of the customer and which has been reserved for a third order information, is changeable and (b) determining whether or not the master warehouse is not stocked with the article which can be reserved for the third order information,
wherein said controller executes reservation for the first order information to reserve the stock in the first or second branch warehouse for the first order information when the non-reserved quantity of the article is equal to or greater than the order quantity of the article, or the reservation is changeable and the master warehouse is stocked with the article which can be reserved for the second or third order information, and
wherein said controller sends information indicating that a day-of-order delivery is impossible to the information processing apparatus via the communication line when the sum of the non-reserved stock quantity and the reserved stock quantity of the article stocked in the branch warehouse and the master warehouse is less than the order quantity of the article.

2. The apparatus according to claim 1, wherein said controller, if the delivery date of the first order information is a later date, executes a process comprising the steps of:
(a) determining whether or not a branch warehouse is stocked with the order quantity of the article which can be reserved for the first order information;
(b) reserving the stock in the branch warehouse for the first order information when the branch warehouse is stocked with the order quantity of the article which can be reserved for the first order information;
(c) checking stock of a retailer or manufacturer when the branch warehouse is not stocked with the order quantity of the article which can be reserved for the first order information; and
(d) deciding that the first order information is a back order when the retailer or manufacturer does not stock the order quantity of the article which can be reserved for the first order information.

3. A control method of a server comprising the steps of:
receiving, by the server, received order information which is received from an information processing apparatus via a communication line and which contains at least information indicating an order quantity of an article, order placement date and time, and a delivery date; and
controlling, by the server, stock reserve of an article using a received order status table into which the order placement date and time, the order quantity, the delivery date, and shipping instruction flags are recorded in a unit of an order number, wherein the shipping instruction flags include a warehouse flag indicating whether the article is stocked in a branch warehouse or master warehouse, and a shipping flag indicating whether shipment of the article is ready or instructed,
wherein if the delivery date of the received order information is today, said controlling step executes a first determination comprising the step of determining whether or not a non-reserved quantity of the article stocked in the branch warehouse and/or the master warehouse is equal to or greater than an order quantity of an article, wherein if the non-reserved quantity of the article is less than the order quantity of the article, said controlling step executes a second determination comprising the steps of (a) determining whether or not reservation of the article, which is stocked in a first branch warehouse nearest an address of a customer of a first order information and which has been reserved for a second order information, is changeable and (b) determining whether or not the master warehouse is stocked with the article which can be reserved for the second order information, wherein said controlling step, if the reservation is not changeable, or the reservation is changeable and the master warehouse is not stocked with the article which can be reserved for the second order information in the second determination, executes a third determination comprising the steps of (a) determining whether or not reservation of the article, which is stocked in a second branch warehouse near to the address of the customer and which has been reserved for a third order information, is changeable and (b) determining whether or not the master warehouse is stocked with the article which can be reserved for the third order information, wherein said controlling step executes reservation for the first order information to reserve the stock in the first or second branch warehouse for the first order information when the non-reserved quantity of the article is equal to or greater than the order quantity of the article, or the reservation is changeable and the master warehouse is stocked with the article which can be reserved for the second or third order information, and wherein said controlling step sends information indicating that a day-of-order delivery is impossible to the information processing apparatus via the communication line when the sum of the non-reserved stock quantity and the reserved stock quantity of the article stocked in the branch warehouse and the master warehouse is less than the order quantity of the article.

4. The method according to claim 3, wherein said controlling step, if the delivery date of the first order information is a later date, executes a process comprising the steps of:

determining whether or not a branch warehouse is stocked with the order quantity of the article which can be reserved for the first order information;

reserving the stock in the branch warehouse for the first order information when the branch warehouse is stocked with the order quantity of the article which can be reserved for the first order information;

checking stock of a retailer or manufacturer when the branch warehouse is not stocked with the order quantity of the article which can be reserved for the first order information; and deciding that the first order information is a back order when the retailer or manufacturer does not stock the order quantity of the article which can be reserved for the first order information.

5. A computer-readable storage medium storing a computer-executable program for causing a computer to perform a control method of a server, the control method comprising the steps of:

receiving received order information which is received from an information processing apparatus via a communication line and which contains at least information indicating an order quantity of an article, order placement date and time, and a delivery date; and controlling stock reserve of an article using a received order status table into which the order placement date and time, the order quantity, the delivery date, and shipping instruction flags are recorded in a unit of an order number, wherein the shipping instruction flags include a warehouse flag indicating whether the article is stocked in a branch warehouse or master warehouse, and a shipping flag indicating whether shipment of the article is ready or instructed, wherein if the delivery date of the received order information is today, said controlling step executes a first determination comprising the step of determining whether or not a non-reserved quantity of the article stocked in the branch warehouse and/or the master warehouse is equal to or greater than an order quantity of an article, wherein if the non-reserved quantity of the article is less than the order quantity of the article, said controlling step executes a second determination comprising the steps of (a) determining whether or not reservation of the article, which is stocked in a first branch warehouse nearest an address of a customer of a first order information and which has been reserved for a second order information, is changeable and (b) determining whether or not the master warehouse is stocked with the article which can be reserved for the second order information, wherein said controlling step, if the reservation is not changeable, or the reservation is changeable and the master warehouse is not stocked with the article which can be reserved for the second order information in the second determination, executes a third determination comprising the steps of (a) determining whether or not reservation of the article, which is stocked in a second branch warehouse near to the address of the customer and which has been reserved for a third order information, is changeable and (b) determining whether or not the master warehouse is stocked with the article which can be reserved for the third order information, wherein said controlling step executes reservation for the first order information to reserve the stock in the first or second branch warehouse for the first order information when the non-reserved quantity of the article is equal to or greater than the order quantity of the article or the reservation is changeable and the master warehouse is stocked with the article which can be reserved for the second or third order information, and wherein said controlling step sends information indicating that a day-of-order delivery is impossible to the information processing apparatus via the communication line when the sum of the non-reserved stock quantity and the reserved stock quantity of the article stocked in the branch warehouse and the master warehouse is less than the order quantity of the article.

* * * * *